United States Patent [19]
Kondo

[11] Patent Number: 5,881,055
[45] Date of Patent: Mar. 9, 1999

[54] BATTERY SAVING SYNCHRONIZATION METHOD IN A COMMUNCATION APPARATUS

[75] Inventor: Takashi Kondo, Tenri, Japan

[73] Assignee: Sharp Kabushiki Kaisha, Osaka, Japan

[21] Appl. No.: 746,750

[22] Filed: Nov. 14, 1996

[30] Foreign Application Priority Data

Nov. 14, 1995 [JP] Japan ................................. 7-295853

[51] Int. Cl.⁶ .................................................. G08C 17/00
[52] U.S. Cl. ........................................ 370/311; 455/343
[58] Field of Search ................ 340/825.44; 344/38.3, 344/343; 370/31

[56] References Cited

U.S. PATENT DOCUMENTS

| 4,804,954 | 2/1989 | Macnak | 370/311 |
| 4,964,121 | 10/1990 | Moore | 370/311 |
| 5,760,699 | 6/1998 | Saka | 370/311 |

OTHER PUBLICATIONS

Y. Noguchi, "Automatic Data Reception Equipment", Japanese Laid–Open Patent Publication No. 5–241997, Laid Open on Sep. 21, 1993.

Y. Murata, "Intermittent Reception System of Mobile Radio Communication System", Japanese Laid–Open Patent Publication No. 62–26940, Laid Open on Feb. 4, 1987.

S. Sagawa, "Intermittent Reception System for Radio Mobile Equipment", Japanese Laid–Open Patent Publication No. 5–252093, Laid Open on Sep. 28, 1993.

K. Natarajan, "Battery Effecient Operation of Scheduled Access Protocol", Japeneses Laid–Open Patent Publication No. 5–207020, Laid Open Aug. 13, 1993.

S. Ichitsubo, "Intermittent Reception System", Japanese Laid–Open Patent Publication No. 5–75523, Laid Open on Mar. 26, 1993.

T. Fujii, "Intermittent Reception System", Japanese Laid–Open Patent Publication No. 5–327586, Laid Open on Dec. 10, 1993.

K. Suzuki, "System and Method for Radio Communication", Japanese Laid–Open Patent Publication No. 5–183487, Laid Open on Jul. 23, 1993.

*Primary Examiner*—Brian Zimmerman
*Attorney, Agent, or Firm*—David G. Conlin; David D. Lowry

[57] ABSTRACT

The invention provides a communication apparatus and method capable of carrying out communication at a low consumed electric power without setting a base station when communication is carried out between a plurality of communication terminals capable of carrying out wireless communication. The communication apparatus 11 transmits a beacon from a transmission function circuit 22 every time the beacon transmission request is generated. A data receivable period is provided after the beacon is transmitted. After the lapse of the receivable period, the supply of the electric power to the transmission and reception processing device 12 is suspended with the power source control circuit 27 to provide a sleep time. The data can be exchanged with reliability without setting the base station by means of a beacon. Addition, the supply of electric power is suspended so that the consumed electric power can be eliminated.

11 Claims, 19 Drawing Sheets

BATTERY SAVING SYNCHRONIZATION METHOD IN A COMMUNCATION APPARATUS

BACKGROUND OF THE INVENTION

1. Field of the Invention

The present invention relates to a portable type wireless communication apparatus and a wireless communication method.

2. Description of the Related Art

In recent years, with portable terminals or information apparatuses represented by so-called electronic notebooks, and notebook type personal computers, information is exchanged between apparatuses in such a manner that the information is obtained from a different apparatus or the information is transmitted to a different apparatus. In portable terminals, data such as sounds and images are converted into digital signals for communication.

Japanese Unexamined Patent Publication JP-A 5-241997 discloses one of the data communication methods adopted between apparatuses. With automatic data receivers shown as a prior art, a minimum amount of electric power which allows a data receipt part thereof to receive the data for reducing the consumed electric power at the time of waiting for communication, and the received data are stored in a buffer without operating a central processing unit (CPU) installed inside when the receipt of the data is detected.

It is necessary to suppress the consumed electric power of portable terminals because such terminals are generally driven by a small-size and light-weight battery device so that such terminals are portable. However, automatic data receivers are far from being sufficient in terms of a low consumption of the electric power because the electric power is constantly supplied to the data receipt part thereof. Consequently portable terminals use a communication apparatus which performs an intermittently receiving operation in communication, thereby suspending the operation of circuits except for the required time with the result that the consumed electric power is suppressed.

In communication between two or more wireless communication apparatuses of the prior art which carry out an intermittently receiving operation, a wireless communication apparatus is assumed which serves as a base station for controlling intensively a timing of outputting signals between the communication apparatuses. Moving stations which are none other than wireless communication apparatuses which do not serve as base stations are synchronized on the basis of a signal transmitted from the wireless communication apparatus serving as the base station, and a time when information can be received is determined using a timer incorporated in the moving stations. In moving stations, receipt circuits are operated only during the data receivable period so that the data receipt process is carried out every time each moving station detects the data that should be received. Except for the data receivable period, the operations of the receipt circuits are suspended in an attempt to reduce the consumed electric power.

Methods for communicating the data intermittently by setting a base station include base-station-controlled methods by which the data are communicated on the basis of signals transmitted from the base station and moving-station-controlled methods by which the data are communicated on the basis of signals transmitted from the moving stations.

Japanese Unexamined Patent Publication JP-A 5-252093 (1993) discloses one of the base-station-controlled communication methods. In the prior art described above, a timer provided on the moving station is operated with a synchronous signal transmitted from the base station which is set in a state of being capable of communicating with all the stations. When each of the moving stations cannot receive the synchronous signal, the receipt circuit is operated until the synchronous signal is detected. Upon the receipt of the synchronous signal, each of the moving stations renews the timer on the basis of the synchronous signal. Consequently, the communication is controlled under the guidance of the base station.

Each of the following patent publications discloses a technique for wireless data communication between moving stations and base station which can communicate with all the stations in the same manner as the prior art described above. Japanese Unexamined Patent Publication JP-A 5-207020 discloses a technique in which after the base station is determined, the moving stations synchronize frames with a signal transmitted from the base station to receive the data under a guidance of the base station. In time division multiplexing communication, each of the moving stations is set in the sleep state during a time except for slots used for the communication.

Furthermore, Japanese Unexamined Patent Publication JP-A 5-327586 discloses a technique in which an intermittent receipt period is prolonged and the receipt frequency is reduced because it is assumed that the frequency of detecting signals will increase in the case where intermittently receiving stations which are none other than the moving stations and detect the quality of channels judge that the channels are sufficiently high in quality. In the same technique, the intermittent receipt period is shortened when the channels are not favorable in quality.

Furthermore, Japanese Unexamined Patent Publication JP-A 5-75523 discloses a technique in which the moving stations synchronize frames with a signal transmitted from the base station to carry out a receipt process under the control of the base station. A concept of a super-frame is introduced so that a plurality of frames comprising time slots of a plurality of moving stations are integrated so that each of the moving stations are suspended during a time except for the slots used for communication at its own station. Still furthermore, Japanese Unexamined Patent Publication JP-A 5-183487 discloses a technique in which the receipt period is shortened when a call receipt process or a call receipt failure is generated. Consequently, the period for receiving the data intermittently is dynamically changed in accordance with the amount of communication.

Japanese Unexamined Patent Publication JP-A 62-26940 discloses one example of the moving-station-controlled communication method. In the communication method disclosed in JP-A 62-26940, when the receipt operation is initiated at power-on or by the registration of an identification number, a signal which requests the base stations which are in a state of being capable of communicating with all the stations, to establish synchronization with other stations is sent. On the other hand, along with transmission of the signal, the receipt period setting timer incorporated in the moving stations is reset. The moving stations are set in a state of being capable of receiving information on the basis of the timer for setting the receipt period. On the basis of a signal requesting the establishment of synchronization from the moving stations, the base station resets the receipt period control timer which corresponds to the moving station. The base station transmits the data to the moving stations in accordance with the receipt period control timer.

In the prior art in which the data are communicated intermittently by setting the base station described above, all the stations which attempt to establish communication adopt an intensive control in which such stations are synchronized with the base station via a signal transmitted from the base station. Consequently, one or more base stations must exist in the constituent devices of the communication system which comprises the base station and moving stations. When the communication system does not include a dedicated base station and comprises only moving stations, any of the moving stations must be set as a base station.

When it is determined that an operator determines which of the moving stations serve as the base station, the convenience of communication apparatuses will be unfavorable. Consequently, it is required to negotiate between respective communication apparatuses to determine which of the moving stations serves as the base station. When the negotiating function described above is incorporated in communication apparatuses, the structure will be complicated and the manufacturing cost thereof will rise. In addition, a transmission and reception process for carrying out the negotiation will be required so that the consumed electric power will rise.

FIG. 22 is a view showing a relation between respective communication apparatuses in the case where the data are communicated intermittently by setting the base station. FIG. 23 is a view showing a receipt pattern at each of the communication apparatuses. In FIG. 22, stations Z1, Z2, Z3 and Z4 which are communication apparatuses exist and stations Z1 and Z2, stations Z2 and Z3, and stations Z3 and Z4 are set in a position so that each of the pair of stations can communicate with each other. In addition, pairs of stations, for example, stations Z1 and Z3 except for the pairs described above are set in a position of being incapable of communicating with each other. In the prior art in which the base station is determined, stations which are capable of communicating with the base station do not serve as a base station. When each of the communication apparatuses is set in a relation shown in FIG. 22, any of the pairs of stations Z1 and Z3, stations Z2 and Z4, stations Z1 and Z4 is set as a base station.

For example, when a station Z1 and a station Z3 are set as the base stations, a station Z4 will be capable of communicating with the station Z3. In addition, although the station Z2 is capable of communicating with the station Z1 and the station Z3, a receipt pattern is set so that the station Z2 is capable of communicating with either of the two stations Z1 or Z3. When it is determined that the station Z2 is capable of communicating with the station Z1, the station Z2 synchronizes with the station Z1 which is the base station so that the station Z2 is capable of communicating with the station Z1. However, the station Z2 does not synchronize with the station Z3 so that the station Z2 is incapable of communicating with the station Z3. When the receipt patterns of the two stations do not agree with each other, the data receivable period of the two stations will be deviated from each other so that no communication is established even when the two stations are positioned at a place where the communication is possible.

SUMMARY OF THE INVENTION

An object of the invention is to provide a communication apparatus and a communication method which do not require setting a communication apparatus serving as a base station at the time of communication between a plurality of communication apparatuses and which are capable of communicating at a low electric power consumption.

The invention provides a communication apparatus which is provided with transmission and reception processing means for transmitting and receiving data by wireless communication, and time counting means for measuring a lapse of time, the apparatus comprising:

control means for repeating an intermittent receipt control wherein the transmission and reception processing means is in operation at intervals of a predetermined period, transmits a beacon indicating that the transmission and reception processing means is set in a state of being capable of receiving the data, and is continued to operate in response to an output from the time counting means after the transmission of the beacon so that the transmission and reception processing means is capable of receiving the data during a guarantee period, and the operation of the transmission and reception processing means is suspended when the guarantee period is expired, wherein the predetermined period is defined so that the average electric power consumed by the intermittent receipt control will be smaller than the electric power consumed in the case where the transmission and reception processing means does not transmit beacons and do keep alive all the time.

According to the present invention, the control means of the communication apparatus intermittently controls receipt in such a manner that in response to the output from the time counting means for measuring the lapse of time, the control means makes the transmission and reception processing means for transmitting and receiving the data operate at intervals of the predetermined period, and transmits a beacon indicating that the transmission and reception processing means is set in the state of being capable of receiving the data. The control means controls the transmission and reception processing means so that the data from other communication apparatuses can be received during the guarantee period after a beacon has been transmitted. The control means suspends the operation of the transmission and reception processing means after the lapse of the guarantee period. Since the communication apparatus suspend the transmission and reception processing means after the guarantee period during which the communication apparatus is capable of receiving the data, electric power is consumed only during a period necessary for data communication. Consequently, the electric power consumption in the communication apparatus can be reduced.

In data-transmission and -receipt between communication apparatuses, the operation of a communication apparatus on the data transmission side is controlled so that the communication apparatus transmits data in response to the beacon transmitted from a communication apparatus on the receipt side. The communication apparatus on the receipt side is set in the state of being capable of receiving data during the guarantee period after the transmission of a beacon, and receives the data. Consequently, the data can be communicated without providing a base station which controls the transmission and receipt of the signal between communication apparatuses with the result that the function of providing the base station can be omitted.

Furthermore, the invention is characterized in that on data receipt by the transmission and reception processing means set in the state of being capable of receiving data, the control means allows the transmission and reception processing means to continue the state of being capable of receiving the data for a predetermined after-receipt guarantee period in response to the output from the time counting means.

According to the invention, upon receipt of data by the transmission and reception processing means in the state of being capable of receiving data, the control means allows the transmission and reception processing means in the state of being capable of receiving the data to receive for a period further extended by the predetermined after-receipt guarantee period from time when the control means receives a data receipt indication from the transmission and reception processing means. Since the receipt of the data enables the continuation of the state of being capable of receiving the data, the data can be received continuously so that the amount of data received per unit time can be increased.

Furthermore, the invention is characterized in that the control means allows the transmission and reception processing means to be in the state being capable of receiving data for a predetermined after-transmission guarantee period in response to an output from the time counting means when the transmission and reception processing means transmits the data.

According to the invention, when the transmit and receive processing means transmits data, the control means allows the transmission and reception processing means to be in the state of being capable of receiving the data during the predetermined after-transmission guarantee period from the time when the transmission of the data is completed. Consequently, response data transmitted from another communication apparatus as a response to the transmit data can be immediately received.

Further, the invention provides a communication apparatus comprising:

transmission and reception processing means for transmitting and receiving packeted data by wireless communication;

control means for controlling an operation of the transmission and reception processing means;

time counting means for measuring a lapse of time; and identification information memorizing means for setting and registering identification information about neighboring communication apparatuses, on the basis of a beacon indicating that the communication apparatus is set in the state of being capable of receiving the data, the beacon being transmitted from a communication apparatus which conducts an intermittently receiving operation, at intervals of a predetermined period;

wherein, in the case where the data are to be transmitted to a communication apparatus whose identification information is not memorized in the identification information memorizing means, the transmission and reception processing means transmits the data immediately, and in the case where the data are to be transmitted to a communication apparatus whose identification information is memorized in the identification information memorizing means, the transmission and reception processing means monitors the beacon from the communication apparatus to which the data are to be transmitted, for a period at least longer than the predetermined period, and transmits and receives the data in response to the receipt of the beacon.

According to the invention, identification information defined on the basis of the beacon transmitted from another communication apparatus is memorized in identification information memorizing means of the communication apparatus. In the case where the identification information memorizing means memorizes the identification information, the transmission and reception processing means waits for the beacon from another communication apparatus for a period longer than the predetermined period and transmits the data after the receipt of the beacon. In addition, in the case where the identification information is not memorized in the identification information memorizing means, the data are transmitted immediately. Consequently, the data communication can be carried out with respect to communication apparatuses which constantly receive the data without transmitting beacons and with respect to communication apparatuses which repeats the sequence of transmitting a beacon, going to the state of being capable of receiving data and going to the state of being asleep.

Furthermore, the invention is characterized in that the identification information memorizing means eliminates the identification information in response to an output of the time counting means after a lapse of the predetermined period since the memorization of the identification information.

According to the invention, the identification information is eliminated after the lapse of the predetermined period after the identification information is memorized in the identification information memorizing means. Consequently, the identification information memorizing means memorizes an identification information carried by beacons with respect to communication apparatuses which are capable of transmitting a beacon at intervals of the predetermined period. Since a beacon is not waited for from the communication apparatuses in which the transmission of a beacon is not expected, in spite of the coexistence of intermittent receiving apparatuses and continuously receiving apparatuses, needless extra waiting time is avoided.

Furthermore, the invention provides a data communication method which is carried out in a communication apparatus network including one or plural first communication apparatuses and one or plural second communication apparatuses, the one or plural first communication apparatuses comprising:

first transmission and reception processing means for transmitting and receiving data by wireless communication;

first time counting means for measuring a lapse of time; and first control means for repeating an intermittent receipt control wherein the first transmission and receipt processing means is operated at intervals of a first period, transmits a beacon indicating that the first transmission and reception processing means is set in a state of being capable of receiving the data, and is continued to operate in response to an output from the time counting means after the transmission of the beacon so that the transmission and reception processing means is capable of receiving the data during a first guarantee period, and then the operation of the first transmission and receipt processing means is suspended after the guarantee period, the one or more second communication apparatuses comprising:

second transmission and reception processing means for transmitting and receiving the data by wireless communication; and second control means for controlling an operation of the second transmit and receive processing means, the second control means being controlled so that the data can be received at all times, wherein when the data are transmitted to the first communication apparatus, the second transmission and reception processing means suspends data transmission and waits for the beacon transmitted from the first communication apparatus for a second period which is set longer than the first period, and transmits the data in response to the receipt of the beacon.

According to the invention, in the communication method which is used at least in the first communication apparatus wherein intermittent receipt control is conducted, and the second communication apparatus wherein the constant receipt control is conducted, the second communication apparatus waits for the beacon transmitted from the first communication apparatus for the second period which is set longer than the first period, when transmitting the data to the first communication apparatus under an instruction from the control means. Upon the receipt of the beacon, the second communication apparatus transmits the data to the first communication apparatus which has transmitted the beacon.

Consequently, since the data are transmitted from the second communication apparatus while the first communication apparatus is in the state of being capable of receiving the data after the transmission of the beacon, the first communication apparatus can reliably receive the data without setting up a base station which controls data communication. It is not required to determine that either the first or the second communication apparatus serves as the base station, and no function for defining the base station may be provided. Additionally, no negotiation is necessary for communication between stations and it is not necessary to conduct the processing of transmitting and receiving extra signals, so that the consumed electric power by the communication apparatuses can be decreased.

Furthermore, the invention is characterized in that the data communication method is carried out in a communication apparatus network including at least the first communication apparatus and the second communication apparatus, and that when transmitting the data to the first communication apparatus, the second transmission and reception processing means waits for the beacon transmitted from the first communication apparatus for the second period, and transmits the data either in response to the receipt of the beacon, or after a lapse of the second period.

According to the invention, in the communication method which is used at least in the first communication apparatus wherein intermittent receipt control is conducted, and the second communication apparatus wherein the constant receipt control is conducted, the second communication apparatus waits for the beacon transmitted from the first communication apparatus for the second period which is set longer than the first period, when transmitting the data to the first communication under an instruction from the control means. Upon receipt of the beacon, the second communication apparatus transmits the data to the first communication apparatus which has transmitted the beacon. Additionally, the second communication apparatus transmit the data to another communication apparatus after a lapse of the second period without receiving the beacon.

Consequently, in the case where the communication apparatus which is expected to receive the data is the first communication apparatus, since the data are transmitted from the second communication apparatus when the first communication apparatus is in the state of being capable of receiving the data after the first communication apparatus has transmitted the beacon, the data can be received with reliability by the first communication apparatus. On the other hand, in the case where the communication apparatus which is about to transmit the data is a communication apparatus which is constantly controlled to be in the state of receiving the data without transmitting the beacon, since the data are transmitted from the second communication apparatus after a lapse of the second period, even the communication apparatus which does not transmit the beacon can receive the data. In any case, it is not required to be aware of the peer station to be either the first apparatus or the second apparatus, so that no trouble is caused to the side of the operator of the communication apparatus. In addition, no negotiation is necessary at the time of communication between the communication apparatuses, it is not required to process the transmit and receive of extra signals with the result that an electric power consumption with the communication apparatuses can be reduced.

Furthermore, the invention is characterized in that the data communication method is carried out in a communication apparatus network including at least the first communication apparatus and the second communication apparatus, and that when broadcasting the data to communication apparatuses in the communication apparatus network, the first or the second transmission and reception processing means adds data identification information to the data and at every time when a beacon from another communication apparatus is received the same data with the same identification information is transmitted until the second period is expired; and when the second or the first transmission and reception processing means has received a plurality of data with the same identification information, the only one data item is made to be effective and the other data items are discarded either by the second or the first transmission and reception processing means.

According to the invention, in the case where the data are broadcasted to a plurality of communication apparatuses, the first and the second transmission and reception processing means adds a different data identification information to each data item to transmit the data. When the first and the second transmission and reception processing means receives a beacon from another communication apparatus until the second period is expired, the first and the second transmission and reception processing means transmits the same data with the same data identification information. When transmission and reception processing means which receives the data which is transmitted from the transmission and receipt processing means receives a plurality of data items with the same data identification information, only one data item is rendered effective while the other data items with the same data identification information are discarded. Even when a communication apparatus for receiving the data receives a plurality of items of the same data during a period of being capable of receiving data, the communication apparatus easily judges from the data identification information that the plurality of data items are the same and therefore the communication apparatus can avoid receiving redundant data which leads to waste of memory for memorizing the same data plural times with the result that the memory area can be effectively used.

Furthermore, the invention is characterized in that the data communication method is carried out in a communication apparatus network including at least the first communication apparatus and the second communication apparatus, and that the first and the second transmission and reception processing means constantly monitor a beacon transmitted from other communication apparatuses in the communication network at least during the second period, when broadcasting to the other communication apparatuses, and broadcast data transmission notice information giving a notice of the data broadcast when having received the beacon from any one of the other communication apparatuses;

the control means for carrying out an intermittently receiving operation sets the transmission and reception processing means in the state of being capable of receiving the data on receiving the notice information, for a predetermined second guarantee period; and the first or the second transmission and receipt processing means transmits after a lapse of the second period.

According to the invention, the communication apparatus which carries out the intermittently receiving operation is set in the state of being capable of receiving the data during the second guarantee period by receiving the data transmitting notice information, so that the communication apparatus receives the data transmitted after a lapse of the second period during the period of being in the state of being capable of receiving data. Consequently, the same information packet is transmitted after insuring all the neighboring stations to be in the data receivable state, so that the same information packet may be transmitted only once while carrying out the intermittently receiving operation, and the electric power for transmitting data can be reduced.

Furthermore, the invention is characterized in that the data communication method is carried out in a communication apparatus network including at least the first and the second communication apparatus, and that the second communication apparatus comprises identification information memory means for setting and memorizing information for identifying the communication apparatus on the basis of a beacon which is transmitted from the communication apparatus carrying out an intermittently receiving operation at intervals of a predetermined period and indicates that the communication apparatus which is carrying out the intermittently receiving operation is in the state of being capable of receiving data; and in the case of broadcasting data in the communication apparatus network, the second transmission and reception processing means refers to the identification information memory means, and transmits the data immediately when data transmission is requested, when the identification information is not memorized in the identification information memory means, or monitors a beacon transmitted from other communication apparatuses for at least a period longer than the first period and transmits the data upon receiving the beacon from the other communication apparatuses, when the identification information is memorized in the identification information memory means.

According to the present invention, the second communication apparatus is provided with identification information memory means for memorizing identification information of the communication apparatus set on the basis of the beacon. When the data are transmitted from the second communication apparatus, the identification information memory means is referred to, and when the entry of the identification information memory corresponds to the communication apparatus to which the data are to be transmitted is memorized in the identification information memory means, the data are transmitted in response to the receipt of a beacon. On the other hand, when the identification information of the communication apparatus to which the data are to be transmitted is not memorized in the identification information memory means, the data are transmitted without waiting for a beacon. In transmission of data, the second communication apparatus does not wait for a beacon from a communication apparatus wherein transmission of a beacon can not be expected, thereby making it possible to prevent expenditure of useless waiting time in the communication apparatuses.

Furthermore, the invention is characterized in that the data communication method is carried out in the communication apparatus network including at least the first and the second communication apparatus and that the second transmission and reception processing means transmits a beacon at intervals of the first period.

According to the invention, the second communication apparatus which is controlled to be set constantly in the state of being capable of receiving data transmits a beacon to other communication apparatus at intervals of the first period. Since even the second communication apparatus transmits the beacon, the data can be received after the beacon has been transmitted without waiting for the lapse of the second period when the data are received from the communication apparatus which carries out the intermittently receiving operation. Thus, the delay time in each of the communication apparatuses can be reduced.

As described above, according to the invention, the communication apparatus transmits a beacon at intervals of a predetermined period with respect to other communication apparatus, and receives the data during the guarantee period set after the beacon has been transmitted. Since the operation of the transmission and reception processing means is suspended after the lapse of the guarantee period, the transmission and reception processing means is suspended until the controlling means awake the transmission and reception processing means so that the electric power consumed in the communication apparatus can be reduced. The data can be received with certitude by providing in the invention a method which inhibits the transmission of data in the sleep state by controlling the communication apparatus so that other communication apparatuses transmit the data in response to the receipt of a beacon lest the data should be out of synchronization caused by the suspension of the operation of the transmission and reception processing means. In addition, when the data are not received, the transmission and reception processing means suspends the operation. Thus, the electric power consumed with the communication apparatus can be reduced.

In addition, according to the invention, since the control means continues the state of being capable of receiving the data for a predetermined period from the time when the transmission and reception processing means receives the data, the communication apparatus can normally receive the data continuously while carrying out an intermittently receiving operation so that the amount of received information per time can be increased.

Furthermore, according to the invention, since the control means continues the state of being capable of receiving the data for the predetermined period from a point when the transmission and reception processing means transmits the data, the communication apparatus can normally receive the response data immediately from other communication apparatus as a response to the transmitted data while carrying out the intermittently receiving operation.

Furthermore, according to the invention, the second communication apparatus waits for the beacon from the first communication apparatus during the second period, and transmits the data to the first communication apparatus in response to the receipt of this beacon. Consequently, when the first communication apparatus is set in the state of being capable of receiving the data after the beacon is transmitted, the data are transmitted from the second communication apparatus so that the data can be received by the first communication apparatus with reliability.

Furthermore, according to the present invention, when the communication apparatus which receives the data is the first communication apparatus, the data can be received after the beacon is transmitted. When the communication apparatus which receives the data is the second communication apparatus, the communication apparatus can receive the data which is transmitted immediately after the end of the second period. Consequently, the communication apparatus can receive the data regardless of whether the communication apparatus carries out the intermittent receipt operation or the continuous receipt operation.

Furthermore, according to the invention, the identification information memory means memorizes information for identifying the communication apparatus which is capable of transmitting the beacon to the communication apparatus for transmitting the data. When the data are transmitted from the communication apparatus, the identification information memory means is referred to so that the data are transmitted at a different timing depending on whether the communication apparatus to which the data are transmitted carries out the intermittently receiving operation or the same device carries out the constant receipt operation. Consequently, in communication apparatuses which carry out any receipt operation, the data can be received at a timing suitable for each communication apparatus.

Furthermore, according to the present invention, the identification information memorized in the identification information memory means is eliminated after the lapse of a predetermined period. Consequently, when the communication apparatus which has transmitted the beacon is moved out of the scope in which data communication can be carried out, the data are immediately transmitted on a request for transmitting the data to this communication apparatus with the result that the following process can be carried out and the generation of a needless waiting time can be prevented.

Furthermore, according to the present invention, in the communication apparatus in the communication apparatus network for broadcasting data, the same information can be transmitted to the intermittently receiving station by transmitting the data from the communication apparatus a plurality of times. Incidentally, redundant data items are eliminated with an identifier added to the data so that the volume for memorizing the data is not used in a wasteful manner.

Furthermore, according to the present invention, the communication apparatus which carries out the intermittently receiving operation receives a data transmission notice information which is transmitted after the beacon is transmitted so that the communication apparatus is set in the state of being capable of receiving the data for the predetermined second guarantee period so that the data are received which is transmitted at the end of the second period with the result that the data can be received at the same time by the communication apparatus which is capable of communicating with the communication apparatus which attempts to transmit the data at the end of the second period. Consequently, the data can be received by all the intermittently receiving stations by one time broadcast packet transmission.

Furthermore, according to the invention, the communication apparatus in the communication apparatus network for broadcasting data memorizes information for identifying the communication apparatus which is capable of transmitting the beacon to the communication apparatus for transmitting the data to the identification information memory means. When the data are transmitted to the communication apparatus, the identification information memory means is referred to so that the data are transmitted to other communication apparatuses at the same time at a different timing depending on whether the communication apparatus to which the data are transmitted carries out the intermittently receiving operation or a continuous receipt operation. Thus, communication apparatuses which carry out any of the receipt operations can receive the data with reliability.

Furthermore, according to the present invention, the second communication apparatus which is controlled to be set in the state of being capable of receiving the data at all times transmits a beacon at intervals of the first period so that the data can be received after the beacon is transmitted without waiting for the second period when the data are received from the communication apparatus which carries out an intermittently receiving operation. Thus, the delay time of receiving the data for each of the communication apparatuses can be reduced.

BRIEF DESCRIPTION OF THE DRAWINGS

Other and further objects, features, and advantages of the invention will be more explicit from the following detailed description taken with reference to the drawings wherein.

DESCRIPTION OF THE PREFERRED EMBODIMENTS

Figure 1:
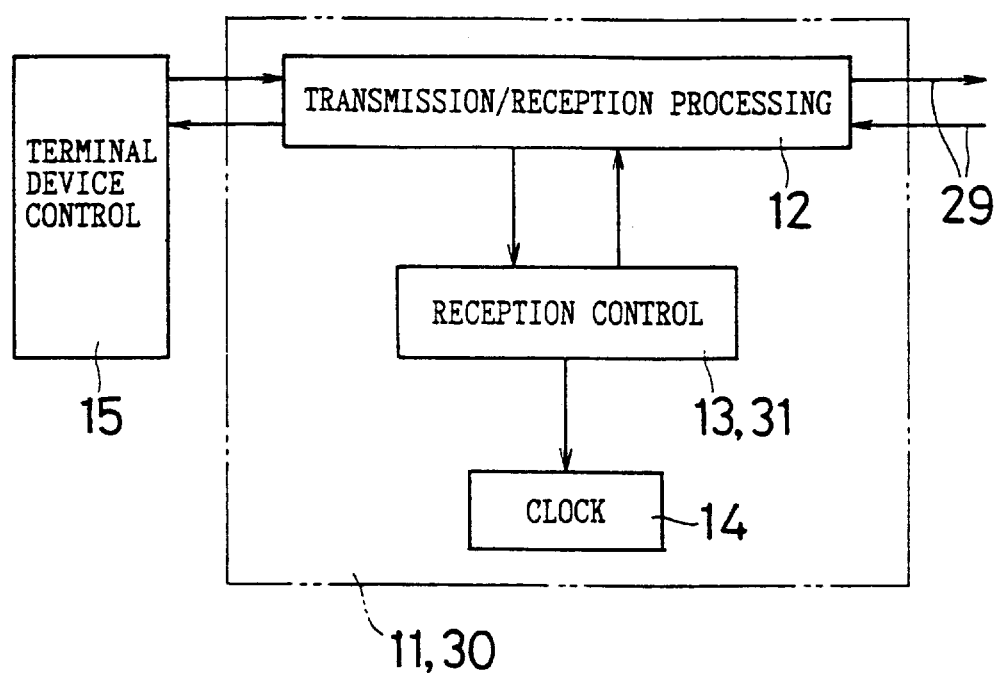
FIG. 1 is a schematic block diagram of a communication apparatus 11 according to a first embodiment of the invention.

Now referring to the drawings, preferred embodiments of the invention are described below.

Figure 2:
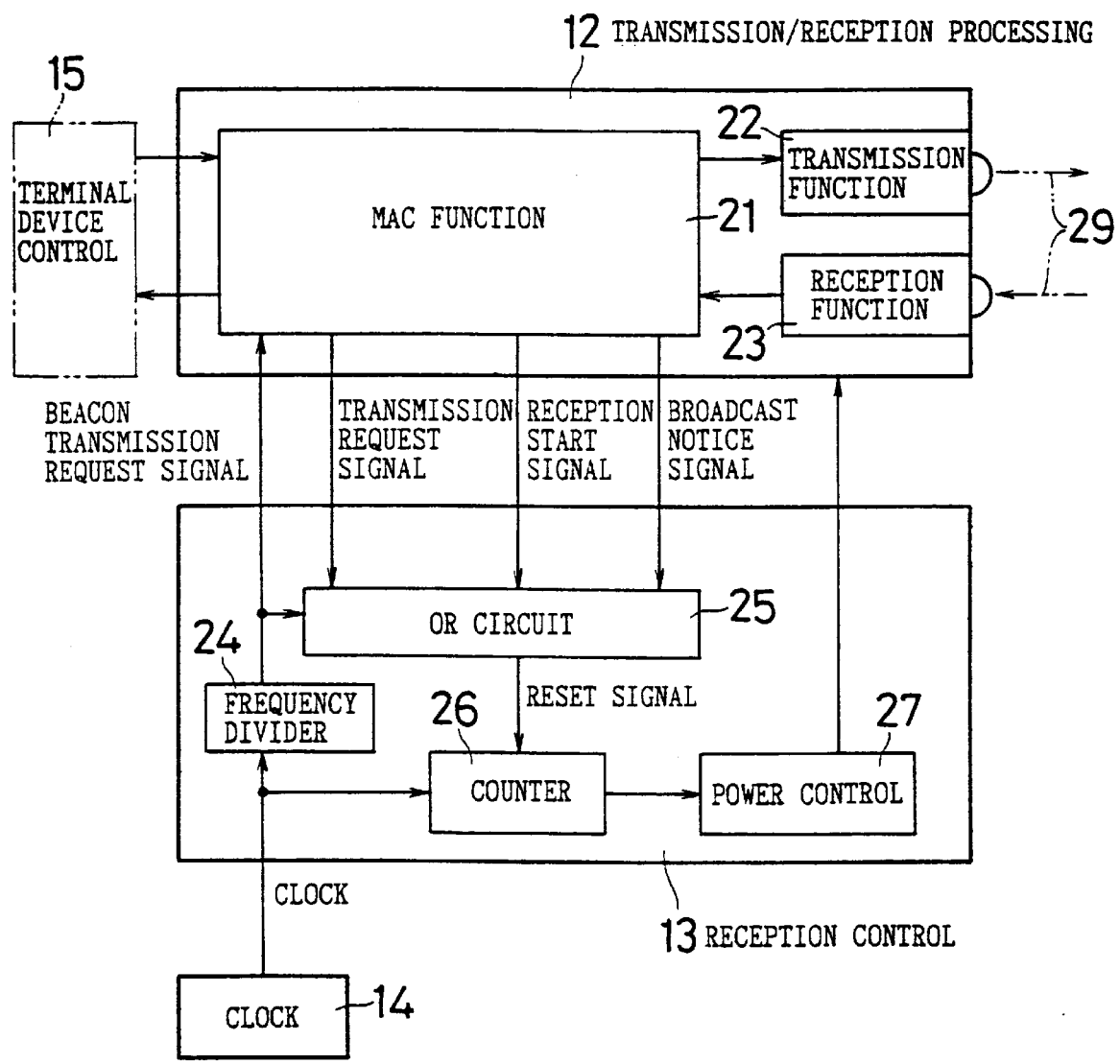
FIG. 2 is a block diagram showing an electric structure of the communication apparatus 11.

FIG. 1 is a schematic block diagram of a communication apparatus 11 according to a first embodiment of the invention. FIG. 2 is a block diagram showing an electric structure of a communication apparatus 11.

The communication apparatus 11 comprises a transmission and reception processing device 12, a reception controller 13 and a clock circuit 14.

The transmission and reception processing device 12 comprises a MAC (Media Access Control) function circuit 21, a transmission function circuit 22 and a reception function circuit 23. In the transmission and reception processing device 12, a arrival of packet to be sent into the communication apparatus 11 from a packet processing circuit 15 of a terminal and data to be transmitted from the communication apparatus 11 is inputted to the MAC function circuit 21. The MAC function circuit 21 controls the data transmission with respect to a communication channel 29. The moment the communication channel 29 is in the state of being capable of communicating with other devices on the basis of the request for transmitting the data from the packet processing circuit 15, the MAC function circuit 21 uses the transmission function circuit 22 to conduct the data transmission processing. In addition, the data transmitted from other devices via the communication channel 29 is received by the reception function circuit 23 to be inputted to the MAC function circuit 21.

When the data is transmitted from the communication apparatus 11 described above, the data is divided into a predetermined size in advance so that the data are exchanged in a so-called packet state in which the information is added with respect to the addressed communication apparatus for each of the divided blocks.

When the MAC function circuit 21 generates a transmission request signal, a reception start signal, and a broadcast notice signal, these signals are inputted to an OR circuit 25 of the reception controller 13 which will be described later. The transmission request signal is generated in the MAC function circuit 21 when the packet processing circuit 15 requests the transmission of the data. The receiving start signal is inputted to the OR circuit 25 when the MAC function circuit 21 detects the data transmitted via the communication channel 29. The broadcast notice signal will be described later. In addition, the MAC function circuit 21 outputs a beacon on the basis of the beacon transmission request signal which is given from a frequency divider 24 which will be described later. The beacon contains am identifier assigned for each apparatus so as to differ from one communication apparatus to another. Thus, it is possible to Judge from which of the communication apparatuses each signal is outputted. The beacon indicates whether the communication apparatus is set in the state of being capable of receiving the data or not. A typical data-structure of the beacon will be described in detail later.

The reception controller 13 comprises a frequency divider 24, an OR circuit 25, a counter 26 and a power source control circuit 27. The clock circuit 14 comprises, for example, a non-stable multi-vibrator and outputs a clock signal to the reception controller 13. The oscillation frequency of the clock signal which is outputted from the clock circuit 14 is set to be common in communication apparatuses which are about to share the communication channel 29. In the reception controller 13, the clock signal given from the clock circuit 14 is inputted to the MAC function circuit 21 and the OR circuit 25 via the frequency divider 24.

The OR circuit 25 supplies a reset signal to the counter 26 on the basis of the clock signal whose frequency is divided by the frequency divider 24 and each signal output from the MAC function circuit 21. The clock signal is given to the counter 26. The clock signal is counted at the counter 26. The counter 26 is reset when the reset signal is generated either when a packet is transmitted, when a packet which should be processed at the packed processing circuit 15 is received or when the broadcast notice packet is received.

Figure 3:
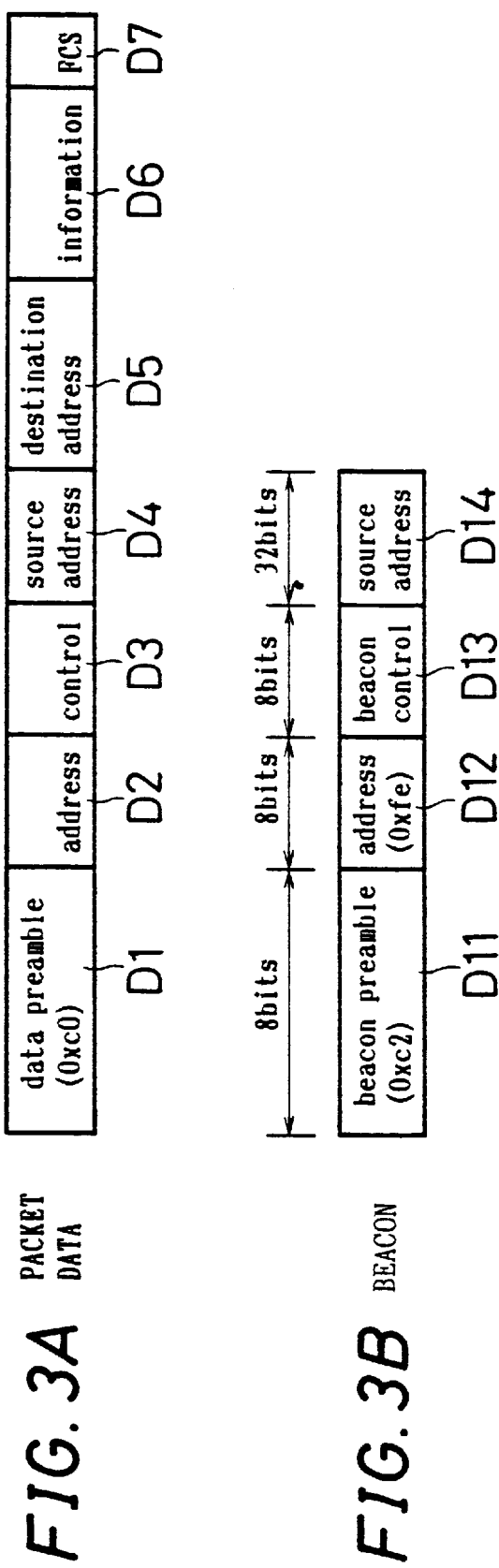
FIG. 3A is a view showing a data structure of packet data.
FIG. 3B is a view showing a data structure of a beacon.

FIG. 3A shows a data structure of packet data, while FIG. 3B shows the data structure of the beacon. The packet data comprise a data preamble D1, an address D2, a control data D3, a source address D4, a destination address D5, information D6 and FCS (Frame Check Sequence) data D7. The beacon comprises a beacon preamble D11, an address D12, a beacon control D13 and a source address D14.

Data and the beacon preambles D1 and D11 are, for example, 1 octet data which represent the beginning of the packet. The data preamble D1 and the beacon preamble D11 are selected so that the two preambles differ from each other. Furthermore, it is determined that the same pattern is not generated in other data parts. For example, the data preamble D1 is "0xc0" (which represents "c0" in the hexadecimal digit) while the beacon preamble D11 is "0xc2" (which represents "c2" in the hexadecimal digit). It is judged from the preambles D1 and D11 of each signal as to whether the received signal is packet data or a beacon.

Addresses D2 and D12 denote an address. For example, the address D12 is defined as "0xfe" (which represents "fe" in the hexadecimal digit). The control D3 is, for example, 1 octet data generally representative of information for determining the function of the packet data, or the kind of the frame. The beacon control D13 is, for example, 1 octet long data representative of the kind of the signal. For example, the beacon control D13 is defined as "0" in the beacon, the beacon control D13 is defined as "1" in the broadcast notice signal described later. The beacon control is defined as "2" in the broadcast signal described later.

Source addresses D4 and D14 are, for example, 32-bit-long data representative of an address of the communication apparatus which transmits a packet. The destination address D5 is a 32-bit-long data in the same manner as the source addresses D4 and D14 representative of the address of the communication apparatus to which the packet data are transmitted. The information D6 is one of the data blocks which are divided into a predetermined size. The data length of information D6 is variable, and generally constitutes 8xN (N is a positive integer) bit-long data.

The FCS data D7 are data for judging whether or not the packet can be normally received without errors when the communication apparatus 11 receives the packet data. For example, the FCS data D7 are 16-bit-long data. The FCS data D7 is a value which is determined by calculating data from address D2 excluding the data preamble D1 up to information D6. Although the beacon shown in FIG. 3B does not include FCS data D7, the signal may be constituted to include the FCS data D7. Supposing that the beacon includes the FCS data, it is possible to detect an error in the transmission of the beacon. However, the consumed electric power of the communication apparatus will increase.

Figure 4:
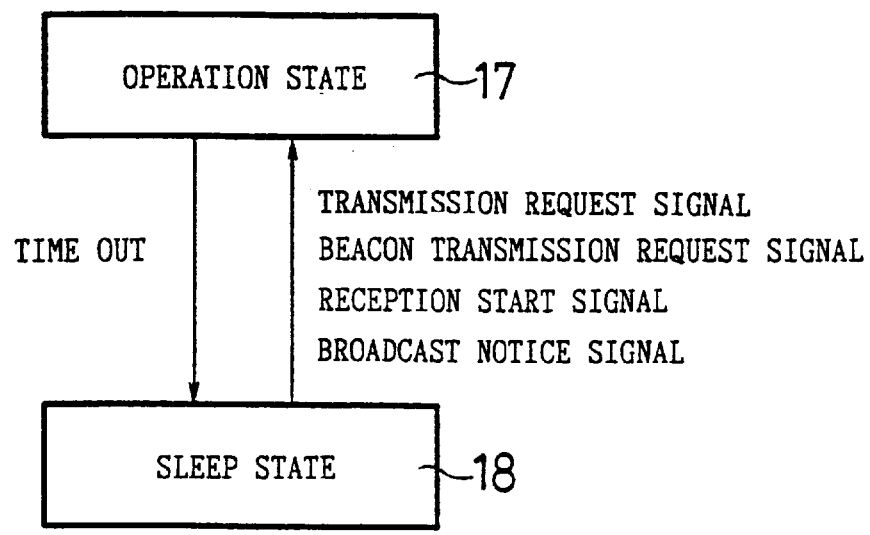
FIG. 4 is a state transition view showing an operation state and a sleep state defined by a power source control circuit 27.

FIG. 4 is a view showing an operation state 17 and a sleep state 18 which are defined by the power source control circuit 27. In the operation state 17, the power source or the clock signal is supplied. In the sleep state 18, the power source or the clock signal is not supplied. The communication apparatus 11 which is set in an operation state 17 transit to the sleep state 18 when the counting operation of the counter 26 detects that the predetermined period has expired. In addition, the communication apparatus 11 which is set in the sleep state transit to the operation state 17 when either the transmission request signal, the beacon transmission request signal, the reception start signal or the broadcast notice signal is detected.

When the communication apparatus is not communicating with other communication apparatuses, the frequency of a signal which is periodically supplied from the clock circuit 14 is divided by the frequency divider 24 so that a beacon transmission request signal is supplied to the MAC function circuit 21. When this beacon transmission request signal is generated, the reception controller 13 uses the aforementioned OR circuit 25 thereby resetting the counter 26. As a result, the power source control part 27 supplies the electric power and the clock to the transmission and receipt processing device 12. The MAC function circuit 21 outputs the beacon packet from the transmission function circuit 22 in accordance with the beacon transmission request signal.

Figure 5:
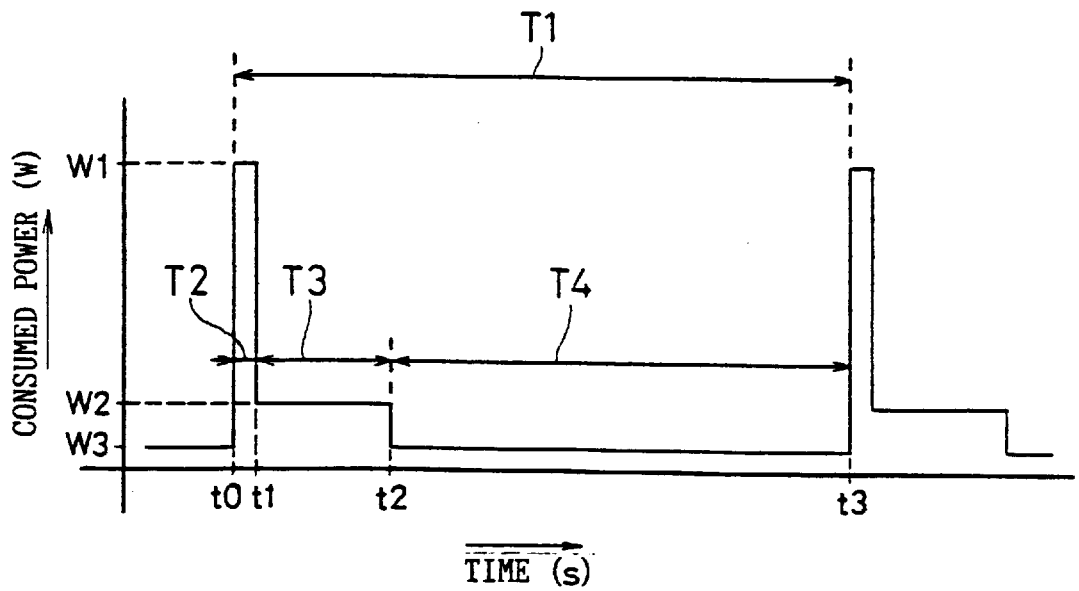
FIG. 5 is a graph showing a relation between time and consumed electric power in the communication apparatus 11.

FIG. 5 is a graph showing a relation between time and consumed electric power in the communication apparatus 11. The abscissa denotes the consumed electric power which is counted in the unit of W (watts) while the ordinate denotes the time which is counted in the unit of sec (seconds). A period T1 from time t0 when the transmission of the beacon is started until time t3 when the transmission of the subsequent beacon is started constitutes a beacon transmission interval which is the first period. A period T2 from time t0 to time t1 is a beacon transmission time. The consumed electric power during the period T2, namely the electric power consumed at the time of transmitting the beacon is power W1.

A period T2 from time t1 to t3 after the beacon is transmitted constitutes a data receivable time which is the guarantee period. In the period T3, the power source or the clock is supplied to the communication apparatus 11 so that the data can be received. The electric power consumed during the period T3 is W2.

A period T4 from time t2 when the state of communication apparatus 11 transits to the sleep state, to time t3 constitutes a repose time. In the period T4, the supply of the electric power or the clock signal is suspended. The electric power consumed in the period T4 is W3.

When no signal is received from the communication channel 29 or no data transmission request is made in the communication apparatus 11, an operation during the period T1 is repeated. For example, supposing that the period T1 which is the beacon transmission period is set to 0.5 sec, the period T2 which is the beacon transmission period is set to 0.001 sec, the period T3 which is the data receivable period is set to 0.049 sec and the period T2 which is a repose time is set to 0.45 sec. The maximum beacon transmission interval which is the second period is set to, for example, 0.6 sec which is longer than the period T1.

Figure 6:
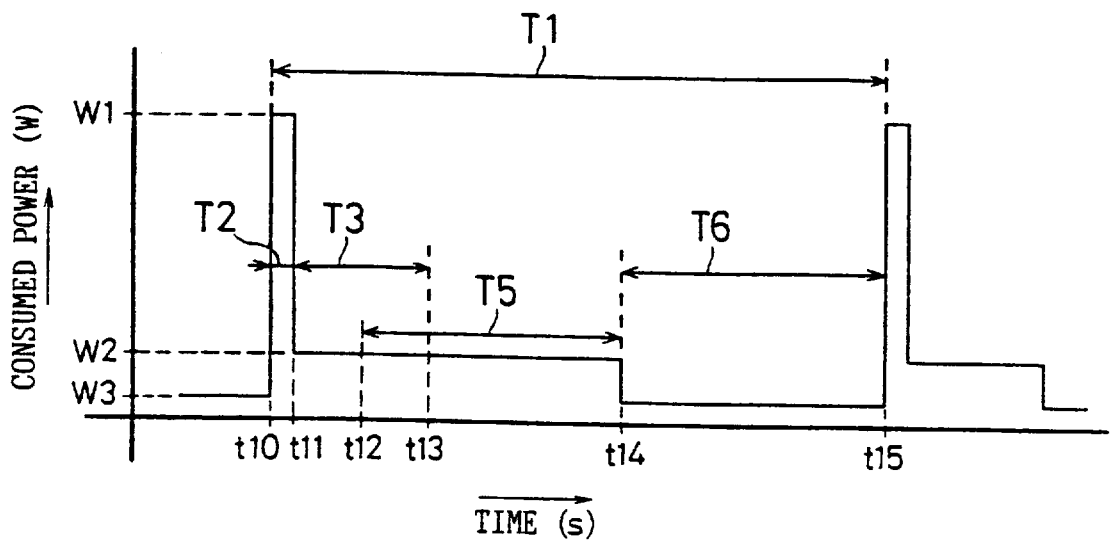
FIG. 6 is a graph showing a relation between time and consumed electric power when data is received in the communication apparatus 11.

FIG. 6 is a graph showing a relation between time and consumed electric power when the data are received at the communication apparatus 11. In FIGS. 6 and 5, like periods and like electric power values are attached with like reference numerals.

The period T2 from time t10 to time t11 is a beacon transmission time. The period T3 from time t11 when the transmission of the beacon is ended to time t13 constitutes the guarantee period. When the data is received at time t12 during period T3, the reception start signal is inputted to the OR circuit 25 from the MAC function circuit 21. With an output of the counter 26 on the basis of the reception start signal the power control circuit 27 continues to supply the electric power to the transmission and reception processing device 12. The period T5 from time t12 when the data are received to time t14 constitutes the after-receipt guarantee period when data can be received. The period T6 from time t14 when the data receivable time is ended to time t15 is a repose time. Though not shown in the drawings, when the data are further received during the period T5, the data receivable time is further set. In other words, the data receivable time is prolonged.

Figure 7:
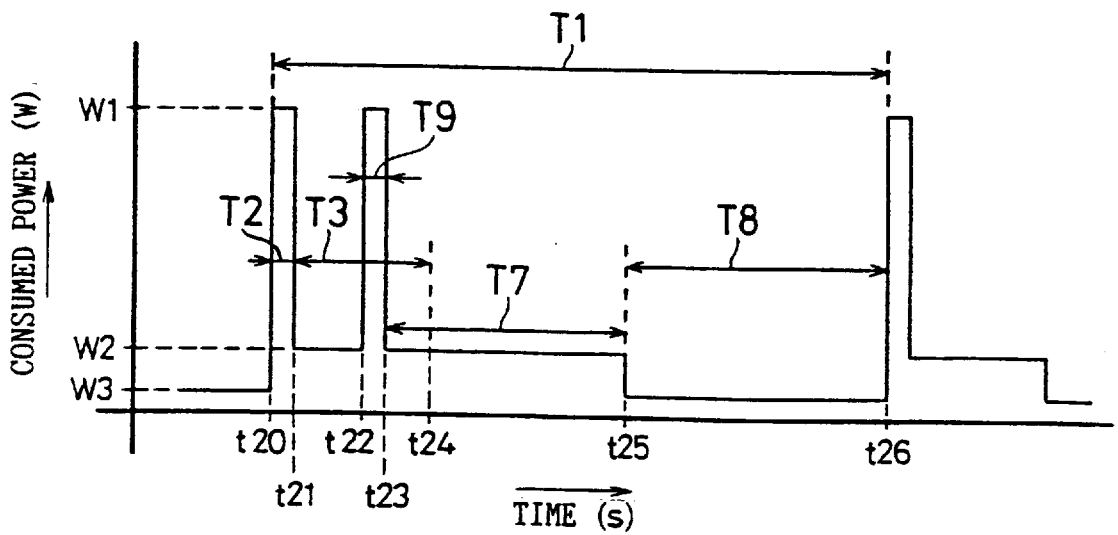
FIG. 7 is a graph showing a relation between time and consumed electric power when data is transmitted in the communication apparatus 11.

FIG. 7 is a graph showing a relation between time and consumed electric power when the data are transmitted in the communication apparatus 11. In FIG. 7, like periods and like electric power values are attached with like reference numerals.

The period T2 from time t20 to time t21 is a beacon transmission period. The period T3 from time t21 to time t24 is the guarantee period. In the guarantee period since the MAC function circuit 21 can accepts the data transmission process request, the data are transmitted in the period T9 from time t22 to time t23 with an input of the transmission request signal to the MAC function circuit 21 at time t22 during the period T3. In addition, the transmission request signal from the MAC function circuit 21 is inputted to the OR circuit 25.

The period T7 from time t23 when the transmission of the data is ended to time t25 is an after-transmission guarantee period when a response signal to the transmitted data is accepted. An output of the counter 26 on the basis of the transmission request signal allows the continuation of the supply of the electric power to the transmission and reception processing device 12. Consequently, the transmission and receiving processing device 12 is held in the state of being capable of receiving the data. A period T8 from t25 after the period T5 to time t26 is a repose time. For example, the period T7 is set to 0.2 sec.

Figure 8:
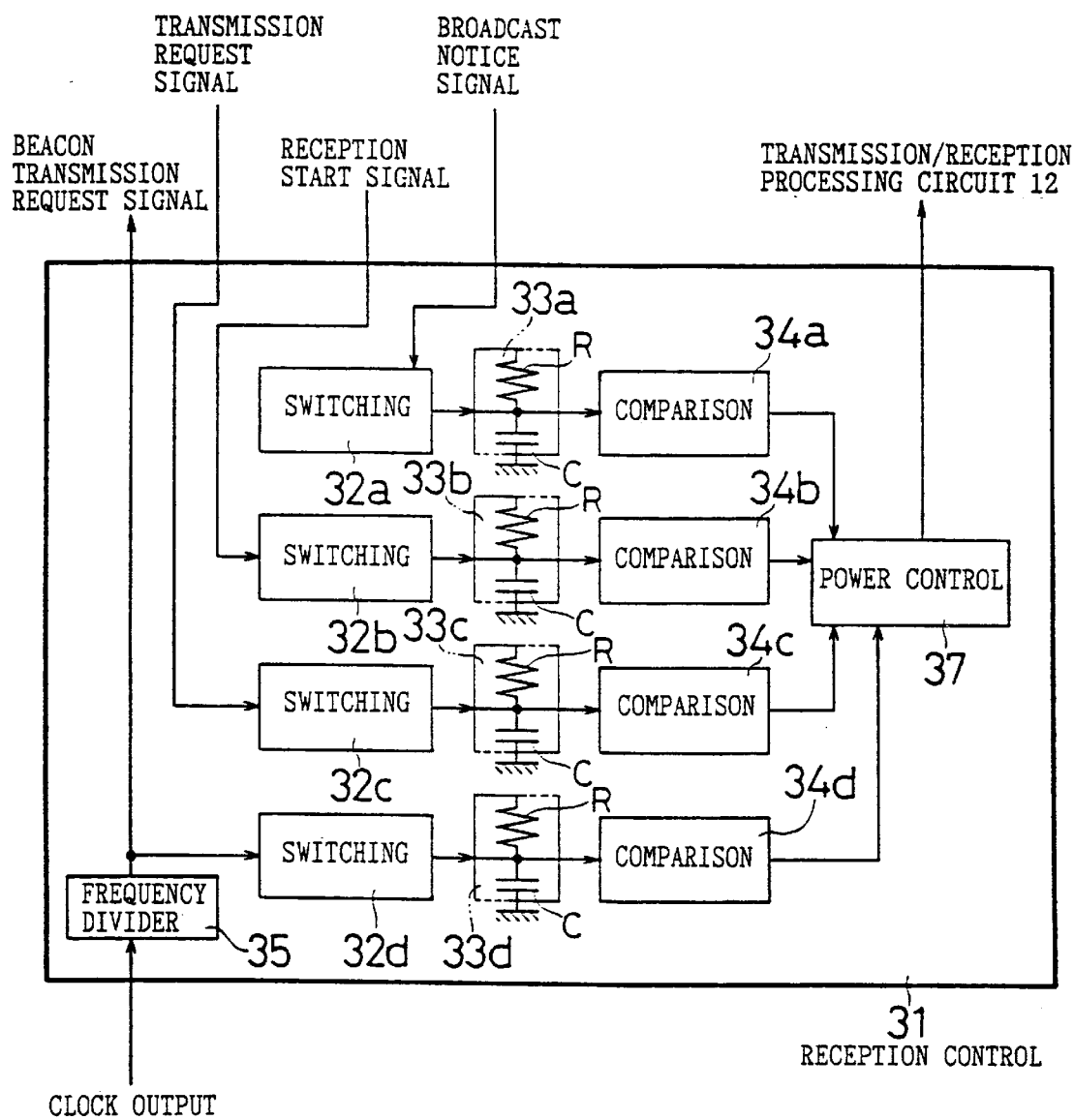
FIG. 8 is a block diagram showing a structure of a reception controller 31.

FIG. 8 is a block diagram showing a structure of a reception controller 31 of the communication apparatus 30 according to another structure of the first embodiment of the invention. The reception controller 31 is characterized by comprising an analog circuit while the reception controller 13 comprises a digital circuit.

The reception controller 31 comprises switching circuits 32a through 32d (reference numeral 32 is used to denote the whole switching circuit), integrator circuits 33a through 33d (reference numeral 33 is used to denote the whole integrator circuit), comparison circuits 34a through 34d (reference numeral 34 denotes the whole comparison circuit), a frequency divider 35 and a power source control circuit 37. A broadcast notice signal is inputted to the switching circuit 32a, a receiving packet detection signal is inputted to the switching circuit 32b, transmission request signal is inputted to the switching circuit 32c. An indication signal transmission request signal which is an output from the frequency divider 35 to which an output of the clock circuit 14 is given is inputted to the switching circuit 32d.

When the switching circuit 32 detects an edge of the rise and the fall of each signal, the circuit 32 short-circuits both ends of the capacitor C of the integrator circuit 33. In the integrator circuit 33, the capacitor C is short-circuited so that an electric charge accumulated in the capacitor C is discharged. After the electric charge is discharged, the electric charge is accumulated again in accordance with the time constant which is determined from the resistance value of a resistor in the integrator circuit 33 and a capacity of the capacitor C. Then a potential difference across the capacitor C rises in a monotonous manner. In the comparison circuit 34, the potential difference across the capacitor C is compared with the predetermined voltage value. An output of the comparison circuit 34 will be positive when, for example, the input signal voltage exceeds the predetermined voltage value. An output of the comparison circuit 34 will be negative when the input signal voltage is not more than the predetermined voltage value.

The output of each of the comparison circuits 34 is inputted to the power source control circuit 37. The power source control circuit 37 suspends the power source when the input signal is all positive. When all the input signals are all positive, the power source control circuit 37 suspends the supply of the power source. When at least one of all the signals is negative, the power source is supplied.

As described above, according to the embodiment of the invention, a beacon is transmitted at intervals of the period. After the beacon is transmitted, the data receivable period is set. Time after the data receivable period within the beacon transmission interval is determined to be a repose time. After the beacon is transmitted, the data can be received with reliability and communication can be carried out by setting a data transmission timing in other communication apparatuses so as to receive the data from other communication apparatuses during this data receivable period without setting a base station for controlling the transmission and receipt of the data between communication apparatuses.

The communication method according to a second embodiment of the invention is carried out by a communication apparatus 11 for carrying out an intermittent receipt control and a communication apparatus 41 which is constantly controlled to be set in the state of being capable of receiving the data. In the communication apparatus 41, the same constituent element as the aforementioned communication apparatus 11 is attached with the same reference numerals. The communication apparatus 41 comprises the transmission and reception processing device 12, the reception controller 13, the clock circuit 14 and a transmission and receipt circuit 42.

Figure 9:
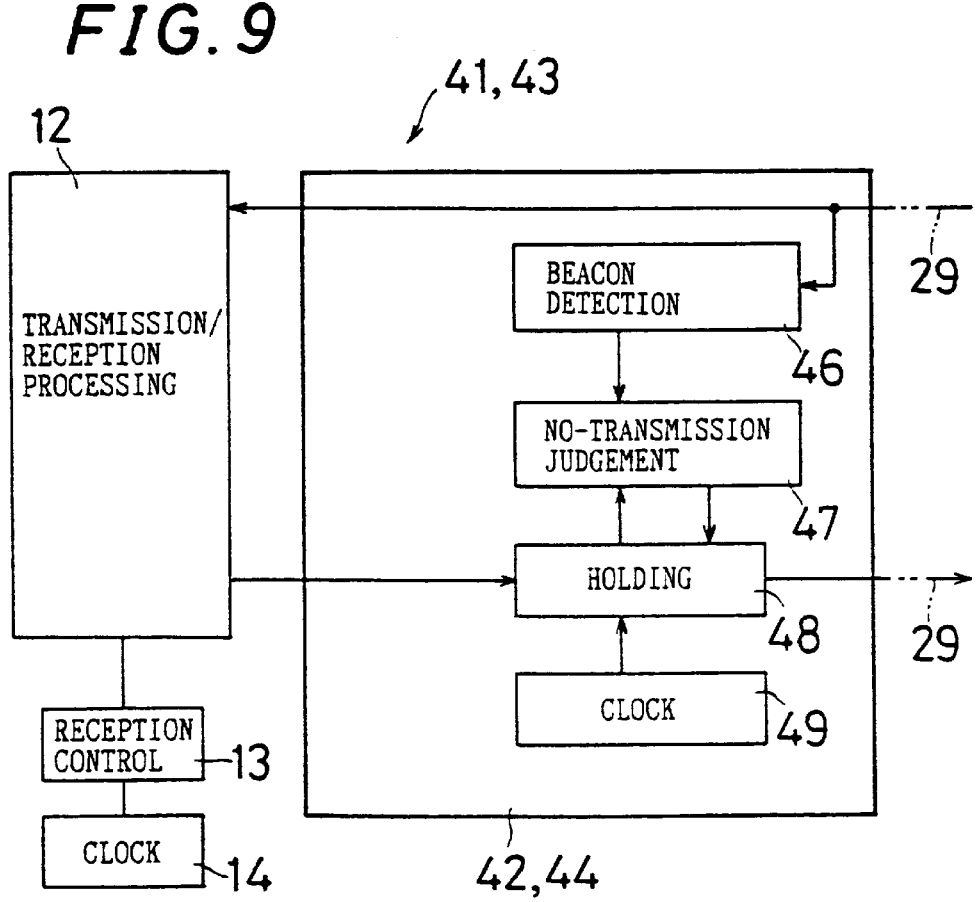
FIG. 9 is a block diagram showing an electric structure of communication apparatuses 41 and 43.

FIG. 9 is a block diagram showing an electric structure of the communication apparatus 41. The transmission and receipt circuit 42 comprises a beacon detecting circuit 46, a no-transmission Judging circuit 47, a holding circuit 48 and a clock circuit 49. The transmission and receipt circuit 42 is provided between the transmission and reception processing device 12 and the communication channel 29. The transmission and receipt circuit 42 has a function of transmission and receipt the data.

When a data transmission request is inputted, the transmission and reception processing device 12 gives pertinent data to the holding circuit 48. The holding circuit 48 holds this given data to supply to the no-transmission judging circuit 47 information on the address to which the information is transmitted.

In addition, the data which are inputted to the data transmission and receipt circuit 42 via the communication channel 29 is inputted to the beacon detecting circuit 46 and the transmission and reception processing device 12. The beacon detecting circuit 46 judges whether the input data is a beacon or not on the basis of the preamble part. The beacon detecting circuit 46 judges whether the input data is a beacon of any of the stations when the input data is a beacon. The information of the judged station is inputted to the no-transmission judging circuit 47.

The no-transmission judging circuit 47 compares information of the station detected in the beacon detecting circuit 46 with information on the station to which the data is transmitted which is given from the holding circuit 48. As a result of the comparison, when a destination of data packet matches the address which is brought from the beacon detection circuit 46. When this signal is given, the holding circuit 48 transmits the held data to the communication channel 29. The data which is transmitted to the communication channel 29 is eliminated from the holding circuit 48. The clock signal is inputted to the holding circuit 48 from the clock circuit 49. Time after the input to the holding circuit 48 is allowed to correspond to respective data which is accumulated in the holding circuit 48. The data is discarded when the period during which the data is held in the holding circuit 48 exceeds the maximum beacon transmission interval.

Figure 10:
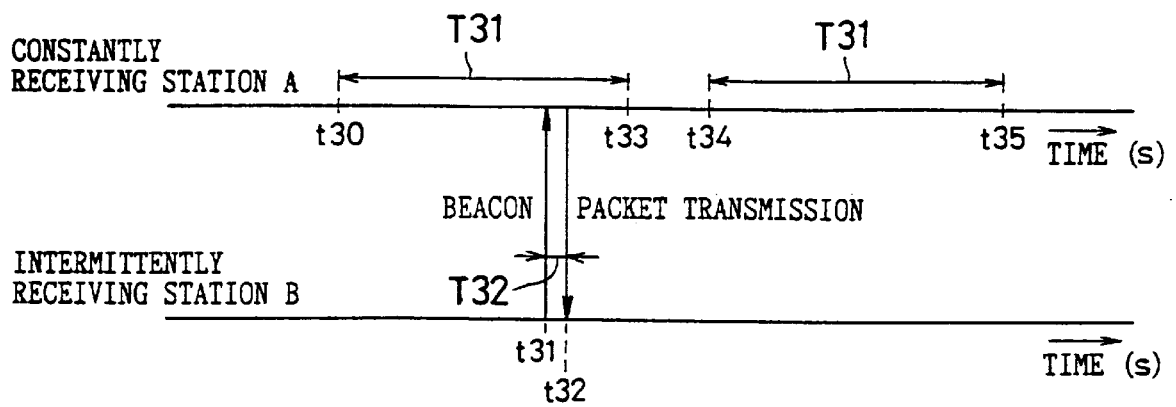
FIG. 10 is a timing chart of each receiving station according to a second embodiment of the invention.

FIG. 10 is a timing chart of each receiving station which is a communication apparatus according to the embodiment of the invention. When the data transmission request is made at time t31 from the constantly receiving station A to the intermittently transmitting and receiving station B, the input of the beacon from the intermittently receiving station B is waited during the period T31 from time t30 to time t31 which is the maximum beacon transmission interval.

When the constantly receiving station A receives a beacon from the intermittently receiving station B at time t31, the constantly receiving station A transmits the data at time t32. The period T32 from time t31 to time t32 which is a period from receipt of the beacon to transmission of the data is set so that the period T32 is shorter than the data receivable period described above. In addition, even when the data transmission request is made at time t34, the data is not transmitted and is abandoned at time t35 unless the beacon is received from the intermittently receiving station B in the period T31 up to time t35.

As described above, in the communication method according to the embodiment of the invention, the constantly receiving station A which is a communication apparatus 41 which attempts to transmit data holds the data supplied from the MAC function circuit 21 in the holding circuit 48 so that the data is transmitted from the holding circuit 48 in response to the receipt of a beacon from the intermittently receiving station B which is a communication apparatus 11. The transmitted data is received by the intermittently receiving station B which is set in the state of receiving the data after the beacon is transmitted. The constantly receiving station A transmits the data after the intermittently receiving station B transmits the beacon. Thus, the intermittently receiving station B located on the data receiving side is capable of receiving the data with reliability unless the base station for controlling the transmission and receipt of the data is set. In addition, the intermittently receiving station B suspends the supply of the electric power to the transmission and receipt processing device 12 except for the data receivable period so that the consumed electric power can be reduced. Incidentally, in the embodiment of the invention, the communication apparatus for transmitting the data is set as the constantly receiving station A, but a communication apparatus for the intermittently receiving operation will do as well.

The communication method according to a third embodiment of the invention is carried out at least by the communication apparatus 11 and the communication apparatus 43 which is constantly controlled to be set in the state of being capable of receiving the data. Since the communication apparatus 43 according to the embodiment of the invention has the same structure as the communication apparatus 41 as described above, an explanation on the structure thereof is omitted, and the characteristics of the communication apparatus 43 will be explained in comparison with the communication apparatus 41. The communication apparatus 43 is provided with the transmission and receipt circuit 44 in place of the transmission and receipt circuit 42.

When the data transmission request is made, the communication apparatus 41 waits for a beacon from the communication apparatus to which the data is transmitted during the maximum indication signal period. The communication apparatus 41 transmits the data in response to the receipt of the beacon. When the beacon is not received during the maximum period of transmitting the beacon, the communication apparatus 41 discarded the data. On the other hand, the communication apparatus 43 transmits the data at the end of the maximum period of transmitting the beacon not only when the beacon is received but also when the beacon is not received. In other words, the holding circuit 48 transmits the data held after the lapse of the maximum period of transmitting the beacon even when a signal is not inputted which indicates that the beacon of the station which should be transmitted from the no-transmission judging circuit 47.

Figure 11:
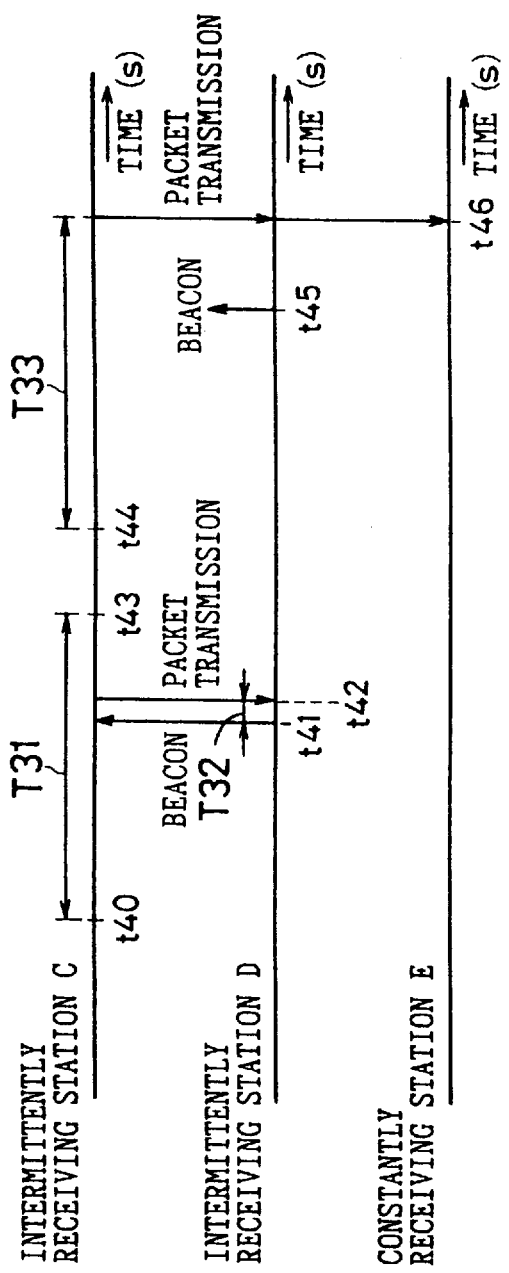
FIG. 11 is a timing chart of each receiving station according to a third embodiment of the present invention.

FIG. 11 is a timing chart of each receiving station which is the communication apparatus according to the third embodiment of the invention. When the data transmission request is made to the intermittently receiving station C at time t40, the beacon from the intermittently receiving station D is waited for during the period T31 which is the maximum period of transmission the beacon from time t40 to time t43. When the intermittently receiving station C receives the beacon from the intermittently receiving station D at time t41 during the period T31, the data is transmitted from the intermittently receiving station C at time t42 after the lapse of the period T32.

When the data transmission request is made at time t44, the input of the beacon is waited for during the period T33 from time t44 to time t46 which period is equal to the period T31. Even when the beacon is not received, the intermittently receiving station transmits the data after the lapse of time T33. Consequently, even the constantly receiving station E which does not transmit the beacon can receive the data at time t46. In addition, even when the beacon which is transmitted from the intermittently receiving station at time t45 during the period T33 is not received by the intermittently receiving station C, the intermittently receiving station D can receive the data when the data is transmitted from the intermittently receiving station C within the data receivable period from time t45.

As described above, in the communication method according to the embodiment of the invention, the intermittently receiving station C transmits the data in response to the receipt of the beacon at intervals of the maximum period of transmitting the beacon. Consequently, the intermittently receiving station D can receive the data with reliability by transmitting the beacon without setting a base station for controlling the transmission and receipt of the data between communication apparatuses. In addition, since the intermittently receiving station C transmits the data after the lapse of the maximum period of transmitting the beacon even when the beacon is not received by the intermittently receiving station C during the maximum period of transmitting the beacon, data can be received even in the constantly receiving station E which transmits no indication signal. Incidentally, in the embodiment of the invention, the station which transmits the data is set as the intermittently receiving station C, but a constantly receiving station will do.

Figure 12:
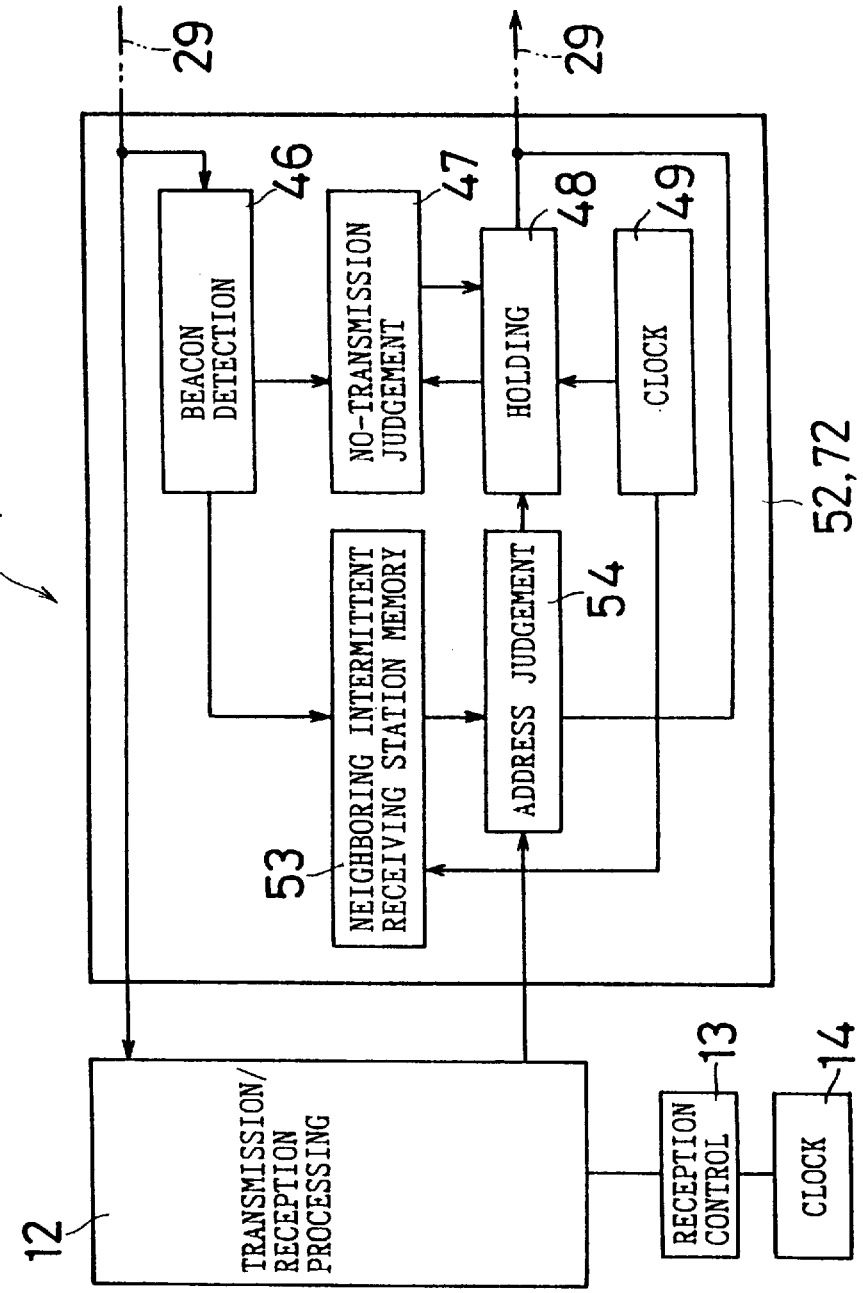
FIG. 12 is a block diagram showing an electric structure of communication apparatuses 51 and 71.

The communication method according to a fourth embodiment of the invention will be used by including at least the communication apparatus 51. FIG. 12 is a block diagram showing an electric structure of the communication apparatus 51. In the communication apparatus 51, the same constituent elements as the communication apparatus 11 are attached with the same reference numerals and the explanation thereof is omitted here. The communication apparatus 51 comprises the transmission and reception processing device 12, the reception controller 13, the clock circuit 14 and the transmission and receipt circuit 52.

In the transmission and receipt circuit 52, the constituent elements same as the transmission and receipt circuit 42 are attached with reference numerals and an explanation thereof will be omitted. The transmission and receipt circuit 52 comprises the beacon detecting circuit 46, the no-transmission Judging circuit 47, the holding circuit 48, the clock circuit 49, a peripheral intermittently receiving station memory 53, and an address Judgment circuit 54.

Information representative of the transmission origin of the beacon detected in the beacon detecting circuit 46 is given to the no-transmission Judging circuit 47 and the peripheral intermittently receiving station memory 53. A clock signal is supplied to the peripheral intermittently receiving station memory 53 from the clock 49. Information with respect to the intermittently receiving station is erased after a predetermined period equal to or longer than the maximum period for transmitting the beacon has elapsed after the information is memorized.

The address Judgment circuit 54 compares the address station in the data transmitted from the transmission and reception processing device 12 with the intermittently receiving station list which is memorized in the peripheral intermittently receiving station memory 53. When the address station is memorized in the intermittently receiving station list of the peripheral intermittently receiving station memory 53, the data is inputted to the holding circuit 48. In the case where the address station is not memorized in the intermittently receiving station list of the peripheral intermittently receiving station memory 53, the address station is regarded as the constant receiving station so that the data is transmitted to the communication channel 29 from the address judgment circuit 54.

Figure 13:
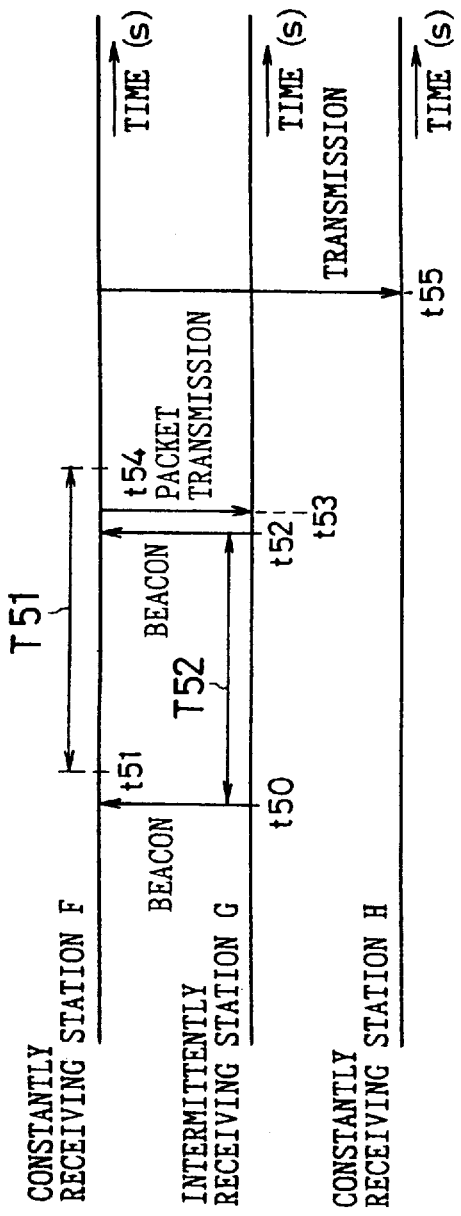
FIG. 13 is a timing chart of each receiving station according to a fourth embodiment of the invention.

FIG. 13 is a timing chart of each communication apparatus according to the embodiment of the invention. When the beacon is inputted to the constant receiving station which is the communication apparatus 51 from the intermittently receiving station G at time t50, information indicative of the presence of the intermittently receiving station within the distance of exchanging the data is memorized in the peripheral intermittently receiving station memory 53.

When the transmission request is generated at the constant receiving station F at time t51, the transmission and receipt circuit 52 judges whether the address station to which the data is transmitted is memorized in the peripheral intermittently receiving station memory 53 or not. When the transmission and receipt circuit 52 judges that address station is the intermittently receiving station which is present on the periphery thereof on the basis of information memorized in the peripheral receiving station memory 53, a beacon from the intermittently receiving station is waited for during the period T51 from time t51 to time t54.

When a beacon transmitted from the intermittently receiving station G is received at the constantly receiving station F at time t52 which has elapsed from time t50 by the period T52 which is a period for transmitting the beacon, the data is transmitted from the constantly receiving station F to the intermittently receiving station G at time t53.

When a data transmission request is made from the constantly receiving station F to the transmission and receipt circuit 52 at time t55, the constantly receiving station F Judges with the transmission and receipt circuit 52 whether the address station to which the data is transmitted is memorized in the peripheral intermittently receiving station memory 53 or not. When the constantly receiving station F Judges that the data is not addressed to the intermittently receiving station whose address is present in the periphery thereof, the data is transmitted immediately.

As described above, in the communication method according to the embodiment of the invention, the constantly receiving station F refers to the peripheral intermittently receiving station memory 53 which memorizes information with respect to the intermittently receiving station memory 53 on the basis of the beacon which is transmitted from other intermittently receiving stations when the constantly receiving station F transmits the data. With respect to the receiving station in which information is not memorized in the peripheral intermittently receiving station memory 53, the data is transmitted without providing the waiting time. With respect to the receiving station in which the information is memorized, the data is transmitted in response to the receipt of the beacon. Consequently, when the station which receives the data is a constantly receiving station, the data can be received without waiting time during the maximum period of transmitting the beacon. The operation described above is carried out on the basis of the timing of a signal which is exchanged between communication apparatuses so that the data can be received with reliability and communication can be carried out at a low consumed electric power without setting the base station for controlling the transmission and receipt of the data between communication apparatuses.

In addition, since information memorized in the peripheral intermittently receiving station memory 53 is erased after the lapse of a predetermined period which is equal to or longer than the maximum period of transmitting the beacon, the beacon is not waited for which is transmitted from the intermittently receiving station to which the transmission of the beacon is no longer expected. Thus, the generation of a useless waiting time can be prevented at the constantly receiving station F.

Figure 14:
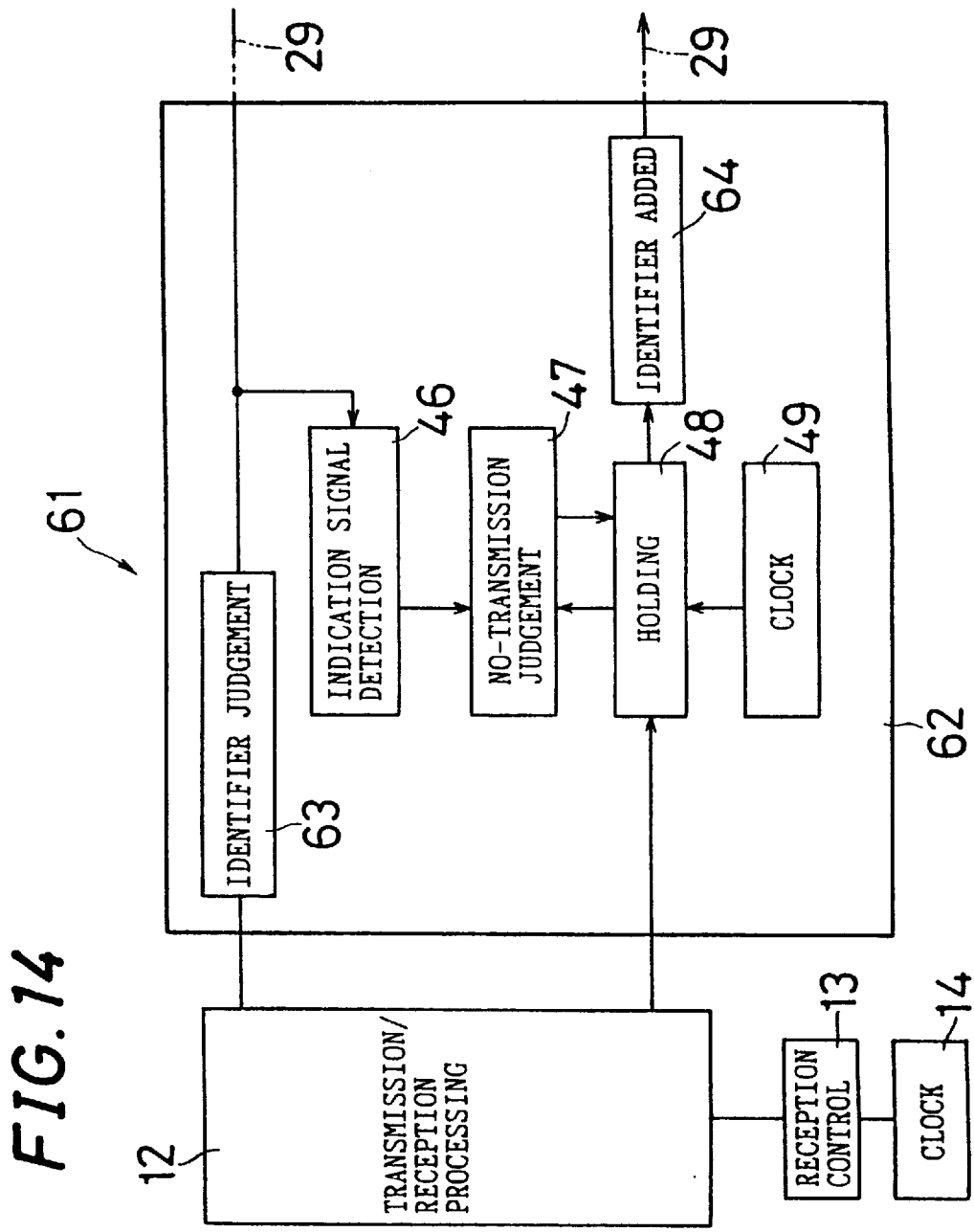
FIG. 14 is a block diagram showing an electric structure of a communication apparatus 61.

The communication method according to a fifth embodiment of the invention is carried out by a plurality of communication apparatuses 61. FIG. 14 is a block diagram showing an electric structure of the communication apparatuses 61. In the communication apparatuses 61, the constituent elements same as the communication apparatus 11 are attached with the same reference numerals and an explanation thereof is omitted. The communication apparatuses 61 comprise the transmission and reception processing device 12, the reception controller 13, the clock circuit 14, and a transmission and receipt identification circuit 62. The transmission and receipt identification circuit 62 has a function of transmission and receipt the data.

In the transmission and receipt identification circuit 62, the constituent elements same as the transmission and receipt circuit 42 are attached with the same reference numerals. The transmission and receipt circuit 62 comprises a beacon detecting circuit 46, a no-transmission judging circuit 47, a holding circuit 48, a clock circuit 49, an identifier judging circuit 63 and an identifier addition circuit 64.

Each data transmitted from the communication apparatus 61 is added with an identifier different from one data to another by the identifier addition circuit 64. The data input to the transmission and receipt identification circuit 62 via the communication channel 29 is inputted to the identifier Judging circuit 63. The identifier judging circuit 63 memorizes data portion including the identifier of the input data. The identifier judging circuit 63 will be described in detail later.

Figure 15:
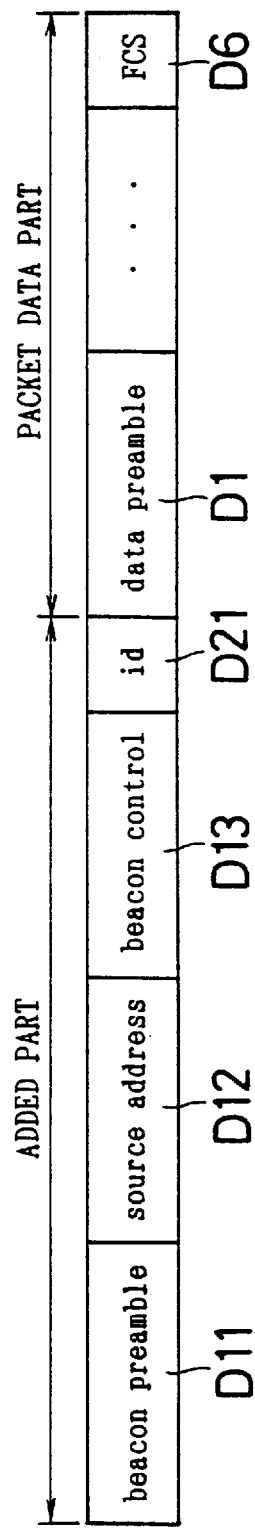
FIG. 15 is a view showing a data structure of packet data to which an identifier is added.

FIG. 15 shows a data structure of packet data to which an identifier is added. The packet data added with the identifier transmitted and received by the communication apparatus 61 comprises an added part including the identifier D21 and a packet data part. In the structure of the added part, the data same as the beacon is added with the same reference numeral and an explanation thereof is omitted. The added part comprises the beacon preamble D11, the address D12, the beacon control D13, the source address D14 and the identifier D21. Since the data structure of the packet data part is the same as the packet data shown in FIG. 3A, an explanation thereof will be omitted. In the beacon control D13, "2" is set as a value which is different from the beacon, for example, in the case where broadcast is carried out.

In the identifier D21, different values are allowed to correspond to respective packet data parts. The added part including the identifier D21 is added to the packet data part with the identifier addition circuit 64. Even when the added part is packet data which is transmitted from any of the communication apparatuses, the part is set so that the added part does not agree with each other. The identifier judging circuit 63 memorizes the added part including the identifier D21. Every time the packet data is received, the identifier judging circuit 63 judges whether or not the added part of the received packet data agrees with the memorized added part. Only when the packet data judging circuit judges that the added part does not agree with each other, the packet data is given to the transmission and reception processing device 12. Consequently, it is possible to prevent the received packet data from being given to the transmission and reception processing device 12 in an overlapping manner.

Figure 16:
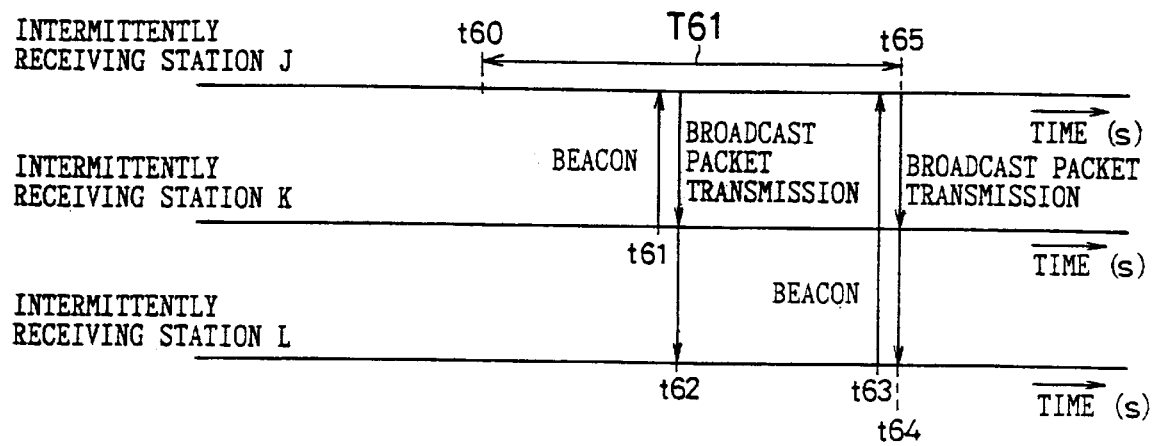
FIG. 16 is a timing chart of each receiving station according to a fifth embodiment of the invention.

FIG. 16 is a timing chart of each communication apparatus according to the embodiment of the invention. In each intermittently receiving station of the timing chart shown in FIG. 16, it is supposed that at least the intermittently receiving station K is one of the communication apparatuses 61. At time t60, when a request for transmitting the broadcast packet is generated at the intermittently receiving station J, the receipt of the beacon from other stations is waited for during the period T61 up to time t65. Every time the beacon is received, the same packet incorporating the same identifier is transmitted repeatedly.

When the beacon transmitted from the intermittently receiving station K is received at the intermittently receiving station J at time t61, a packet having the same content and a predetermined identifier added is transmitted to the intermittently receiving stations J, L at time t62. Since the intermittently receiving station L is generally set in the sleep state at time t62, this packet is received only at the intermittently receiving station K which is set in the data receivable state after the beacon is transmitted.

When the beacon which is transmitted from the intermittently receiving station L is received at the intermittently receiving station J at time t63, a packet having the same content as the packet received at the intermittently receiving stations K and L at time t64, the intermittently receiving station K receives the two packets having the same content, the packet received by the identifier judging circuit 63 at time t64 will be discarded assuming that the intermittently receiving stations K and L are set in the state of being capable of receiving the data.

As described above, in the communication method according to the embodiment of the invention, the intermittently receiving station J transmits the same data in which the same identifier is added to the intermittently receiving stations K and L when the intermittently receiving station J detects the beacon from, for example, the intermittently receiving station during the maximum period of transmitting the beacon. By such means, broadcast is performed to the intermittently receiving station. At the intermittently receiving station which has received the data, the identifier of the pertinent data is judged. When the identifier is the same as the identifier of the data which has been already received, the received data is discarded. When the identifier is different, the data is given to the transmission and reception processing device 12 to memorize the identifier added to the data at the identifier judging circuit 63.

In the communication apparatus for communicating by the communication method according to the embodiment of the invention, since it is correctly Judged that the same data item is transmitted in a repeated manner even when a plurality of the same data items are received, a correct communication can be carried out even when the consumed power is lowered by means of intermittent receipt. In addition, the memory capacity for memorizing the received data is not used in a useless manner. The operation described above is carried out on the basis of the timing of a signal transmitted and received between the communication apparatuses. Consequently, the receipt of the data is carried out with reliability and communication can be carried out at a low consumed electric power without setting a base station for controlling the transmission and receipt of the data between communication apparatuses.

Figure 17:
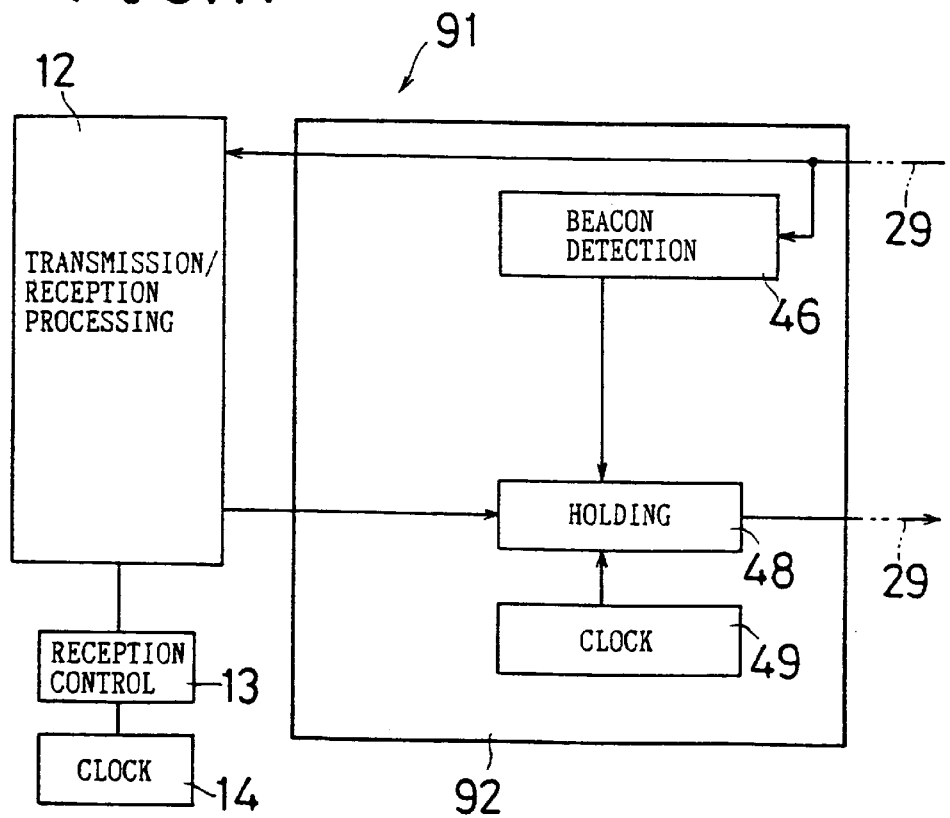
FIG. 17 is a block diagram showing an electric structure of a communication apparatus 91.

The communication method according to a sixth embodiment of the invention is used by including at least the communication apparatus 91. FIG. 17 is a block diagram showing an electric structure of the communication apparatus 91. In the communication apparatus 91, the constituent elements same as the communication apparatus 11 are attached with the same reference numerals and an explanation thereof will be omitted. The communication apparatus 91 comprises the transmission and reception processing device 12, the reception controller 13, the clock circuit 14 and a transmission and receiving circuit 92.

In the transmission and receipt circuit 92, the constituent elements same as the transmission and receipt circuit 42 are attached with the same reference numerals and an explanation thereof will be omitted. The transmission and receipt circuit 92 comprises a beacon detecting circuit 46, a broadcast data holding circuit 48 and a clock circuit 49. The transmission and receiving circuit 92 has a function of transmission and receiving the data.

Incidentally, the broadcast data holding circuit 48 according to the sixth embodiment of the invention has the same structure as the holding circuit 48 in the embodiments described above. In this particular embodiment, the broadcast packet data is dealt with so that the circuit is referred to as a broadcast data holding circuit 48.

When a request for transmitting the broadcast packet data is made in the communication apparatus 91, the broadcast packet data is inputted to the broadcast data holding circuit 48 from the transmission and reception processing device 12. When the data remains in the broadcast data holding circuit 48, a beacon transmitted from other communication apparatuses is waited for during the maximum period of transmitting the beacon. When a beacon transmitted from other communication apparatuses is detected at the beacon detecting circuit 46, the broadcast data holding circuit 48 broadcasts the broadcast notice data to other communication apparatuses via the communication channel 29. Later, every time the beacon from other communication apparatuses is detected during the maximum period of transmission the data, the broadcast notice packet is transmitted. When the maximum period of transmitting the beacon has passed, the broadcast data holding circuit 48 broadcasts and transmits the broadcast packet data to other communication apparatuses. In other communication apparatuses, when the broadcast notice packet is received, the broadcast notice signal is inputted to the reception control circuit 13 so that the data receivable period is prolonged. Consequently, the broadcast packet data can be received which is transmitted at the time of the lapse of the maximum period of transmission the beacon.

Figure 18:
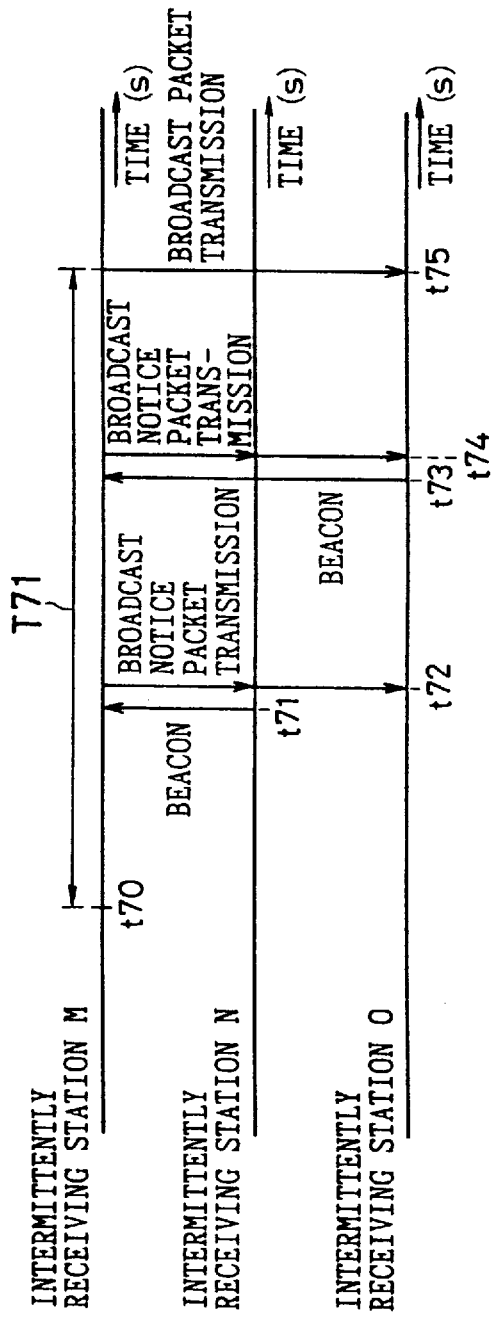
FIG. 18 is a timing chart of each receiving station according to a sixth embodiment of the invention.

FIG. 18 is a timing chart of each of the communication apparatuses in the communication method according to the sixth embodiment of the invention. Suppose that at least the intermittently receiving station M is the communication apparatus 91. When a request for transmitting the broadcast packet data is made at the intermittently receiving station M at time t70, a beacon from other communication apparatuses is waited for during the period T71 from time t70 to time t75. When the beacon transmitted from the intermittently receiving station N is received by the intermittently receiving station M at time t71, the intermittently receiving station M broadcasts the broadcast notice packet which gives a notice of transmitting the broadcast packet at time t72 to all the stations, namely the intermittently receiving station N and the intermittently receiving station O. The broadcast notice packet transmitted in this way can be received also by the intermittently receiving station N which is set in the state of being capable of receiving the data. The intermittently receiving station N is set in the state of being capable of receiving the data at least until time t75 by receiving the broadcast notice packet.

When the beacon which is transmitted from the intermittently receiving station O is received at the intermittently receiving station M at time t73, the broadcast notice packet is transmitted and broadcast to two other intermittently receiving stations N and O which are set in the state of being capable of receiving the data at time t74 in the same way as at time t72. Since the intermittently receiving stations N and O are both set in the state of being capable of receiving the data at time t74, the broadcast notice packet can be received. The two intermittently receiving stations described above can be set in the state of being capable of receiving the data by receiving the broadcast notice packet. The intermittently receiving station M transmits the broadcast packet data at time t75 when the period T71 ends. The broadcast packet data is received at the intermittently receiving stations N and O which are set in the state of being capable of receiving the data.

As described above, in the communication method according to the embodiment of the invention, when the intermittently receiving station M detects a beacon from other communication apparatuses during the maximum period of transmitting the beacon, the broadcast packet is transmitted. At the intermittently receiving station which has received the broadcast notice packet, the data receivable period is prolonged so that the broadcast packet data which is transmitted from the intermittently receiving station after the lapse of the maximum period of transmitting the beacon is received. As a consequence, the broadcast packet data can be received without the generation of a time difference of receiving the data at respective receiving stations. The operation described above is carried out on the basis of a timing of a signal exchanged between communication apparatuses. Thus, the data can be received with reliability and the communication is carried out at a low consumed electric power without setting the base station for controlling the transmission and receipt of the communication apparatuses. Besides, in the embodiment of the invention, the station for transmitting the data is set as an intermittently receiving station M, but the same station may be a receiving station which carries out a constant receipt operation.

The communication method according to a seventh embodiment of the invention is used by including at least the communication apparatus 71. The communication apparatus 71 according to the embodiment of the invention comprises at least a transmission and receipt circuit 72. The transmission and receipt circuit 72 comprises the same constituent elements as the transmission and receipt circuit 52 shown in FIG. 12.

When the peripheral intermittently receiving station memory 53 memorizes information on the receiving stations, the broadcast packet is transmitted to the holding circuit 48. This broadcast packet is transmitted to other stations via the communication channel 29 on the basis of the judgment result of the no-transmission judging circuit 47 every time the beacon detecting circuit 46 detects the beacon.

Figure 19:
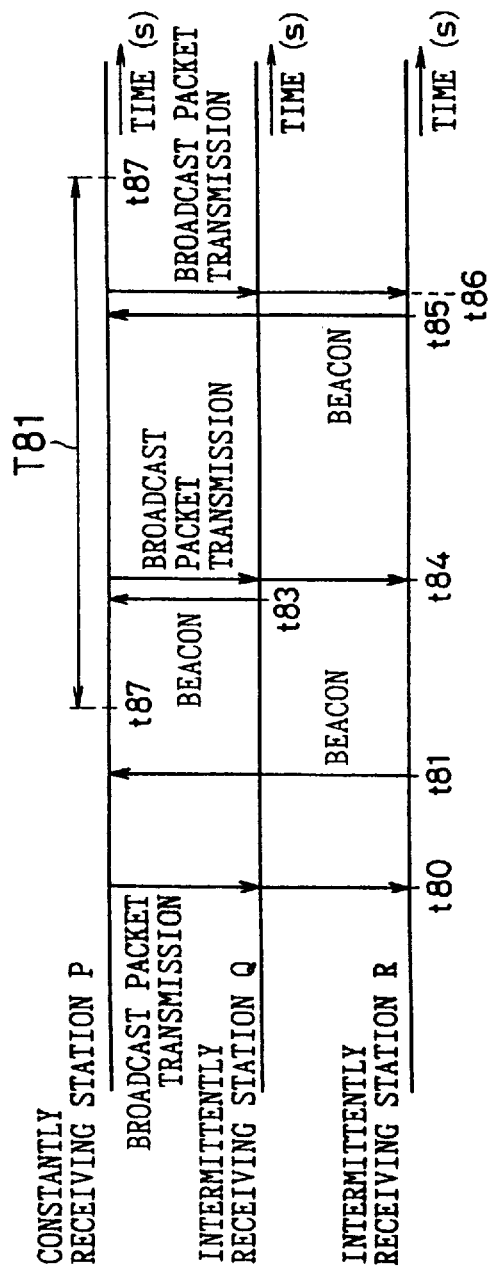
FIG. 19 is a timing chart of each receiving station according to an seventh embodiment of the invention.

FIG. 19 is a timing chart of each receiving station which is a communication apparatus according to the embodiment of the invention. When at time t80 a request for transmitting the broadcast packet is made at the constant receiving station P which is a communication apparatus 71, the transmission and receipt circuit 72 refers to the peripheral intermittently receiving station memory 53 which is memorized in advance. For example, when no information is memorized with respect to any of the intermittently receiving stations, the transmission and receipt circuit 52 transmits the broadcast packet to the intermittently receiving station Q and the intermittently receiving station R at time t80.

When the constant receiving station P receives a beacon which is transmitted from the intermittently receiving station at time t81, information with respect to the intermittently receiving station R is memorized in the peripheral intermittently receiving station memory 53. When a request for transmitting the broadcast packet is made at time t82, the transmission and receipt circuit 72 refers to the peripheral intermittently receiving station memory 53. Since the beacon is received and information on the intermittently receiving station R is memorized in the intermittently receiving station memory 53 at time t81, the transmission and receipt circuit 72 waits for a beacon from other stations during the period T81 from time t81 to time t87. When the constant receiving station P receives the beacon which is transmitted from the intermittently receiving station Q at time t83 during the period T81, the broadcast packet is transmitted to the intermittently receiving stations Q and R at time t84. This broadcast packet is received at the intermittently receiving station Q which is set in the state of being capable of receiving the data.

When the constant receiving station P receives a beacon which is transmitted from the intermittently receiving station R at time t85 during the period T81, the broadcast packet is transmitted at time t86. After the lapse of the period T81, this broadcast packet is discarded.

As described above, in the communication method according to the embodiment of the invention, the intermittently. receiving station refers to the peripheral receiving station memory 53 at the time of transmitting the data simultaneously to other communication apparatuses. When the peripheral intermittently receiving station memory 53 memorizes a list of the peripheral intermittently receiving station, the beacon is waited for during the maximum period for transmitting the beacon so that the broadcast data is transmitted to other intermittently receiving station in response to the beacon. When the list is not memorized in the peripheral intermittently receiving station memory 53, the broadcast signal is immediately transmitted to other intermittently receiving stations in response to the beacon. The operation described above is carried out on the basis of the timing of a signal exchanged between communication apparatuses. The data can be received with reliability and the communication can be carried out at a low consumed electric power without setting the base station for controlling the transmission and receipt of the data between the communication apparatuses. Incidentally, in the embodiment of the invention, the station for transmitting the data is set as a constant receiving station P, but the station may be an intermittently receiving station.

The communication method according to an eighth embodiment of the invention is carried out by including at least the communication apparatus 81. The communication apparatus 81 comprises a transmission and reception processing device 82 and a terminal control circuit 83. The terminal control circuit 83 is the same as the control circuit 15 of the terminal described above.

Figure 20:
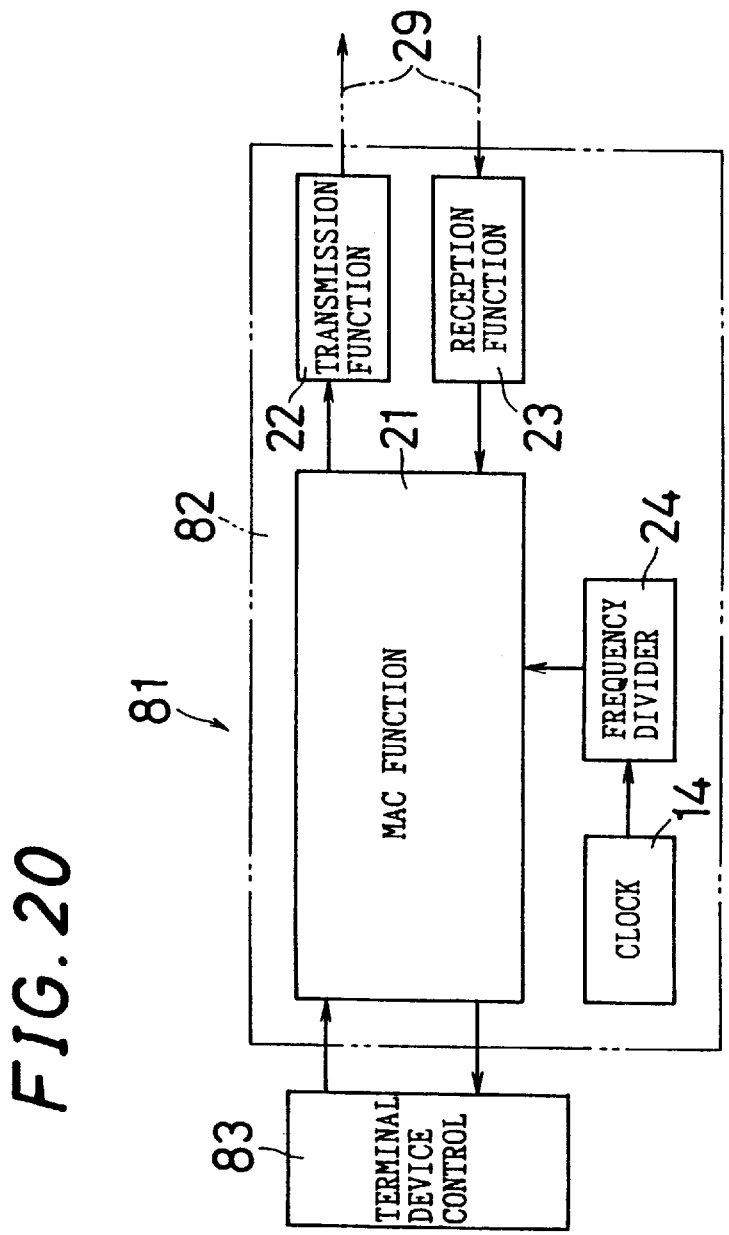
FIG. 20 is a block diagram showing an electric structure of a communication apparatus 81.

FIG. 20 is a block diagram showing an electric structure of the transmission and reception processing device 82. The transmission and reception processing device 82 is constituted by adding to a transmission and reception processing device 12 shown in FIG. 2, a clock circuit 14 and a frequency divider 24 included in the reception controller 13. The same constituent elements in the transmission and reception processing device 12 and the reception controller 13 are attached with the same reference numeral and an explanation thereof will be omitted.

In the transmission and reception processing device 82, the frequency of the clock signal which is generated in the clock circuit 14 is divided with the frequency divider 24 and is supplied to the MAC function circuit 21 as a signal for regulating the timing of transmitting a beacon. The communication apparatus 81 is controlled so that the beacon is transmitted to other stations every time interval of transmitting the beacon and the communication apparatus 81 is controlled so as to be set into the state of receiving data except for the period when the beacon is transmitted.

Figure 21:
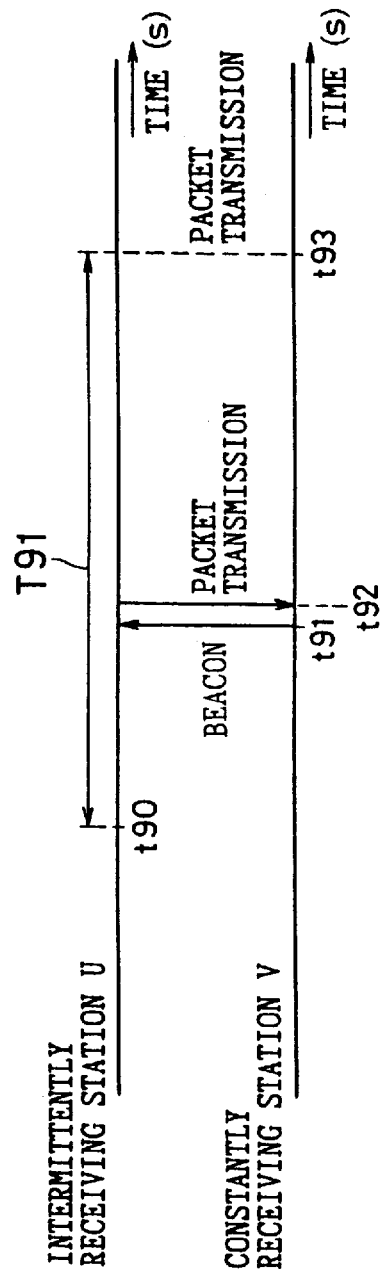
FIG. 21 is a timing chart of each receiving station according to an eighth embodiment of the invention.
Figure 22:
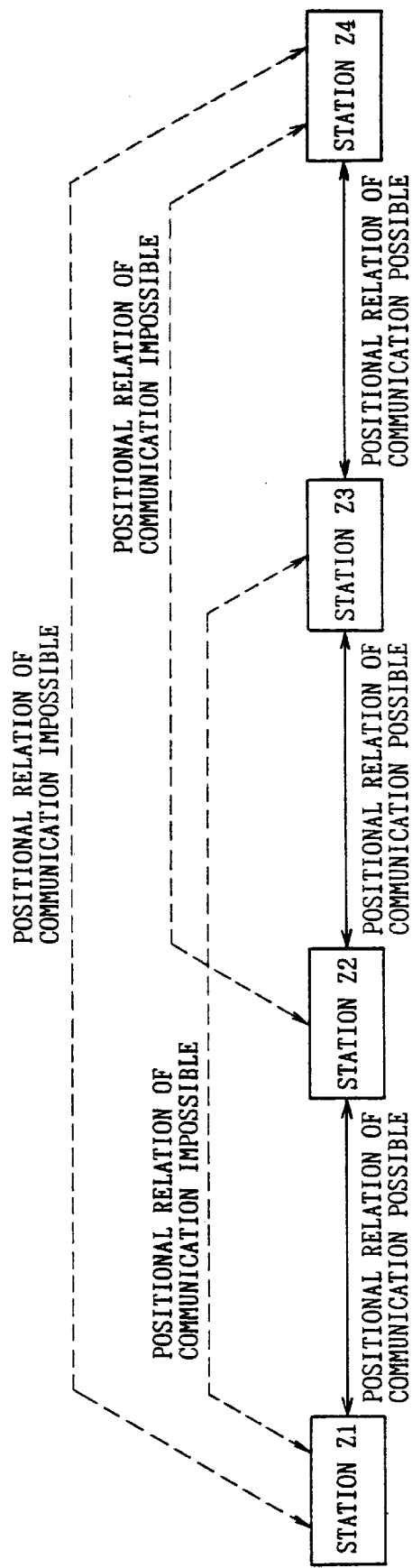
FIG. 22 is a view showing relations between respective communication apparatuses when communication is carried out by setting a base station.
Figure 23:
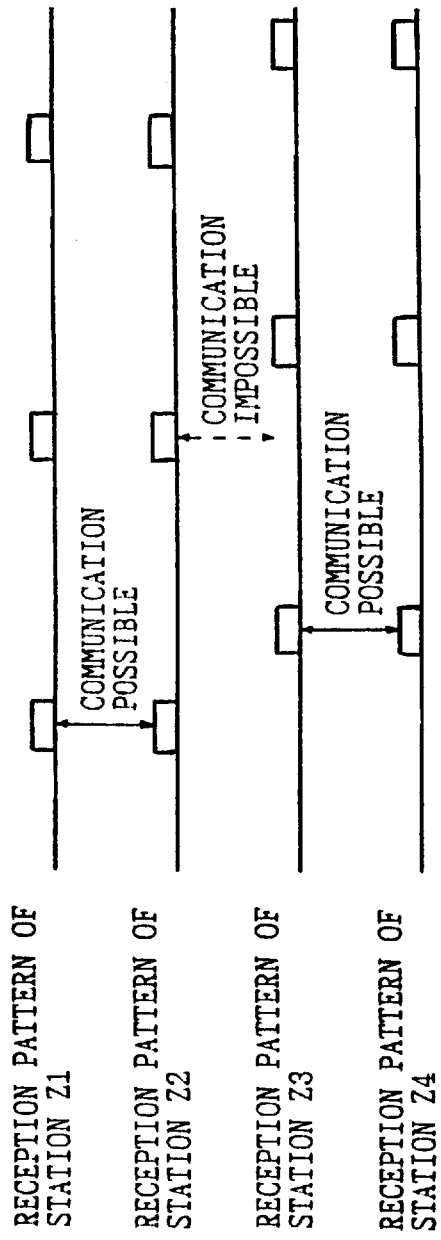
FIG. 23 is a view showing a receiving pattern of each communication apparatus.

FIG. 21 is a timing chart of each communication apparatus according to the embodiment of the invention. When a packet transmission request is made at the intermittently receiving station at time t90, a beacon from other stations is waited for during the period T91 from time t90 to time t93. When the packet is transmitted to the constant receiving station which does not transmit the beacon, the packet is transmitted at time t93 when the period T91 ends.

In the case of the communication apparatus 81, the beacon is transmitted to other stations for each one predetermined period. When the beacon which is transmitted from the constant receiving station V which is the communication apparatus 91 is received at the intermittently receiving station U at time t91, the packet is transmitted to the constant receiving station V from the intermittently receiving station U at time t92.

As described above, in the communication method according to the embodiment of the invention, the intermittently receiving station V divides the frequency of the clock signal which is supplied from the clock circuit 14 so that a period for transmitting the beacon is prepared which does not exceed the maximum period of transmitting the beacon, thereby descending the beacon on the basis of the prepared period for transmitting the beacon. As a consequence, it is not required to wait for the data after the lapse of the maximum period for transmitting the beacon. In this manner, the delay time in the receipt of the data with other intermittently receiving station can be reduced. The operation described above is carried out on the basis of a timing of a signal which is exchanged between the communication apparatuses. The data can be received with reliability and communication is carried out at a low consumed electric power without setting a base station for controlling the transmission and receipt of the data between communication apparatuses.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A communication apparatus which is provided with transmission and reception processing means for transmitting and receiving data by wireless communication, and time counting means for measuring a lapse of time, the apparatus comprising:

control means for repeating an intermittent receipt control wherein the transmission and reception processing means is in operation at intervals of a predetermined period, transmits a beacon indicating that the transmission and reception processing means is set in a state of being capable of receiving the data, and is continued to operate in response to an output from the time counting means after the transmission of the beacon so that the transmission and reception processing means is capable of receiving the data during a guarantee period, and the operation of the transmission and reception processing means is suspended when the guarantee period is expired;

wherein the predetermined period is defined so that the average electric power consumed by the intermittent receipt control will be smaller than the electric power consumed in the case where the transmission and reception processing means does not transmit beacon and do keep alive all the time.

2. The communication apparatus of claim 1, wherein on data receipt by the transmission and reception processing means set in the state of being capable of receiving data, the control means allows the transmission and reception processing means to continue the state of being capable of receiving the data for a predetermined after-receipt guarantee period in response to the output from the time counting means.

3. The communication apparatus of claim 1, wherein the control means allows the transmission and reception processing means to be in the state being capable of receiving data for a predetermined after-transmission guarantee period in response to an output from the time counting means when the transmission and reception processing means transmits the data.

4. A communication apparatus comprising:

transmission and reception processing means for transmitting and receiving packeted data by wireless communication;

control means for controlling an operation of the transmission and reception processing means;

time counting means for measuring a lapse of time; and identification information memorizing means for setting and registering identification information about neighboring communication apparatuses, on the basis of a beacon indicating that the communication apparatus is set in the state of being capable of receiving the data, the beacon being transmitted from a communication apparatus which conducts an intermittently receiving operation, at intervals of a predetermined period;

wherein, in the case where the data are to be transmitted to a communication apparatus whose identification information is not memorized in the identification information memorizing means, the transmission and reception processing means transmits the data immediately, and in the case where the data are to be transmitted to a communication apparatus whose identification information is memorized in the identification information memorizing means, the transmission and reception processing means monitors the beacon from the communication apparatus to which the data are to be transmitted, for a period at least longer than the predetermined period, and transmits and receives the data in response to the receipt of the beacon.

5. The communication apparatus of claim 4, wherein the identification information memorizing means eliminates the identification information in response to an output of the time counting means after a lapse of the predetermined period since the memorization of the identification information.

6. A data communication method which is carried out in a communication apparatus network including one or plural first communication apparatuses and one or plural second communication apparatuses, the one or plural first communication apparatuses comprising:

first transmission and reception processing means for transmitting and receiving data by wireless communication;

first time counting means for measuring a lapse of time; and first control means for repeating an intermittent receipt control wherein the first transmission and receipt processing means is operated at intervals of a first period, transmits a beacon indicating that the first transmission and reception processing means is set in a state of being capable of receiving the data, and is continued to operate in response to an output from the time counting means after the transmission of the beacon so that the transmission and reception processing means is capable of receiving the data during a first guarantee period, and then the operation of the first transmission and receipt processing means is suspended after the guarantee period, the one or more second communication apparatuses comprising:
  second transmission and reception processing means for transmitting and receiving the data by wireless communication; and
  second control means for controlling an operation of the second transmit and receive processing means, the second control means being controlled so that the data can be received at all times,
  wherein when the data are transmitted to the first communication apparatus, the second transmission and reception processing means suspends data transmission and waits for the beacon transmitted from the first communication apparatus for a second period which is set longer than the first period, and transmits the data in response to the receipt of the beacon.

7. The data communication method of claim 6, the data communication method being carried out in a communication apparatus network including at least the first and the second communication apparatus, wherein
  when transmitting the data to the first communication apparatus, the second transmission and reception processing means waits for the beacon transmitted from the first communication apparatus for the second period, and transmits the data either in response to the receipt of the beacon, or after a lapse of the second period.

8. The data communication method of claim 6, the data communication method being carried out in a communication apparatus network including at least the first and the second communication apparatus, wherein
  when broadcasting the data to communication apparatuses in the communication apparatus network, the first or the second transmission and reception processing means adds data identification information to the data and at every time when a beacon from another communication apparatus is received the same data with the same identification information is transmitted until the second period is expired; and
  when the second or the first transmission and reception processing means has received a plurality of data with the same identification information, the only one data item is made to be effective and the other data items are discarded either by the second or the first transmission and reception processing means.

9. The data communication method of claim 6, the data communication method being carried out in a communication apparatus network including at least the first and the second communication apparatus, wherein
  the first and the second transmission and reception processing means constantly monitor a beacon transmitted from other communication apparatuses in the communication network at least during the second period, when broadcasting to the other communication apparatuses, and broadcast data transmission notice information giving a notice of the data broadcast when having received the beacon from any one of the other communication apparatuses;
  the control means for carrying out an intermittently receiving operation sets the transmission and reception processing means in the state of being capable of receiving the data on receiving the notice information, for a predetermined second guarantee period; and
  the first or the second transmission and receipt processing means transmits after a lapse of the second period.

10. The data communication method of claim 6, the data communication method being carried out in a communication apparatus network including at least the first and the second communication apparatus, wherein
  the second communication apparatus comprises identification information memory means for setting and memorizing information for identifying the communication apparatus on the basis of a beacon which is transmitted from the communication apparatus carrying out an intermittently receiving operation at intervals of a predetermined period and indicates that the communication apparatus which is carrying out the intermittently receiving operation is in the state of being capable of receiving data; and
  in the case of broadcasting data in the communication apparatus network, the second transmission and reception processing means refers to the identification information memory means, and
  transmits the data immediately when data transmission is requested, when the identification information is not memorized in the identification information memory means, or
  monitors a beacon transmitted from other communication apparatuses for at least a period longer than the first period and transmits the data upon receiving the beacon from the other communication apparatuses, when the identification information is memorized in the identification information memory means.

11. The data communication method of claim 6, the data communication method being carried out in a communication apparatus network including at least the first and the second communication apparatus, wherein
  the second transmission and reception processing means transmits a beacon at intervals of the first period.

* * * * *